United States Patent [19]
Jervis et al.

[11] Patent Number: 5,835,769
[45] Date of Patent: Nov. 10, 1998

[54] APPARATTI AND COMPUTER PROGRAM PRODUCTS FOR INTEGRATING EDITORS WITH APPLICATIONS

[75] Inventors: Robert B. Jervis, Monte Sereno; Daniel J. O'Leary, Mountain View; Achut P. Reddy, San Jose; Evan W. Adams, San Leandro; Robin Jeffries, Palo Alto, all of Calif.

[73] Assignee: Sun Microsystems, Inc., Mt. View, Calif.

[21] Appl. No.: 530,019

[22] Filed: Sep. 19, 1995

[51] Int. Cl.⁶ .................................................. G06F 17/24
[52] U.S. Cl. .............................................................. 395/701
[58] Field of Search ................................. 395/701, 200.01

[56] References Cited

U.S. PATENT DOCUMENTS 5,537,546  7/1996  Sauter .................................. 395/200.01
5,652,888  7/1997  Burgess ..................................... 395/683

*Primary Examiner*—Emanuel Todd Voeltz
*Assistant Examiner*—John Q. Chavis
*Attorney, Agent, or Firm*—Fenwick & West LLP

[57] ABSTRACT

Methods, apparatti and computer program products allow one or more editors to provide integrated functionality with one or more applications. The methods, systems and computer program products allow a user to select from among several editors which are not integrated with an application, yet interact with the editor and application as though the editor and application were integrated. One or more editors are assigned to each application and commands sent from each application are transformed into a command readable by the editor associated with the application. The command is sent to the editor, which is then able to display files to provide an appearance that the editor and the application are integrated. User generated commands from the editors may be sent to all of the applications or only a subset of the applications to allow the user to control one or more applications from the editor user interface.

11 Claims, 6 Drawing Sheets

APPARATTI AND COMPUTER PROGRAM PRODUCTS FOR INTEGRATING EDITORS WITH APPLICATIONS

RELATED APPLICATION

The subject matter of this application is related to the subject matter of application Ser. No. 08/530,595, pending, entitled, "METHOD AND APPARATUS FOR LINKING COMPILER ERROR CODES TO RELEVANT INFORMATION" filed concurrently herewith by Achut P. Reddy, Daniel J. O'Leary, Robert B. Jervis, Robin Jeffries and Evan W. Adams and having the same assignee as the present invention and is incorporated herein by reference in its entirety.

COPYRIGHT AUTHORIZATION

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF INVENTION

The present invention relates to computer software, and more specifically to the integration of editors with applications.

BACKGROUND OF THE INVENTION

Editors are widely used in the computer field. Many editors are text editors which display text on a computer screen and allow a user to modify the appearance or the content of the text. Many editors allow the user to make such changes through the use of an editor-specific command structure of key sequences, menus or both. Many application programs, such as electronic mail programs or debugger programs, include a text editor to allow the user of the application program to change the content of data used by the application. Typically, each application contains its own unique editor to allow the user to input or change the content of data. Because the editor commands in each of these editors are often editor-specific, a user must learn several different command structures in order to use the several editors contained in the application programs he or she uses. Although for word processing purposes a user may select an independent editor, i.e. an editor that is not contained in the word processing program, many applications such as electronic mail or debuggers require the use of an editor specific to that application in order to integrate the editor with the application. An integrated editor and application work together to provide such features as the display by the editor of parts of an application source file along with the display of application specific icons. Thus, each application provider desiring an editor with integrated functionality must write and include an editor for use with the application, thereby extending the development time for producing the application. Additionally, the user of a document text editor or editors integrated with various applications must learn several command structures because the applications do not allow the user to utilize the same editor across applications and the editors included with one application may operate differently from the other editors.

Many editors are integrated with the associated application program to allow the editor and the application program to communicate. This communication allows the editor to control the application program, the application program to control the editor, or both. For example, many compiler debuggers contain an integrated editor which allows the user to communicate with the debugger via commands typed to the editor. For example, the integrated debugger contained in the Delphi compiler available commercially from Borland International of Scotts Valley, Calif. allows the user of the editor to instruct the editor to instruct the compiler to set a breakpoint. Additionally, when the compiler detects an unrecoverable error, it automatically runs the editor, which displays the file and displays an icon indicating the approximate location of the code containing the error and another icon indicating nearby breakpoints.

Some applications allow a user to select an editor to create and modify text which is subsequently used by the application. While this approach allows a user to use the most desirable editor, the selected editor is not truly integrated with the application in the manner according to the present invention.

One approach which has attempted to eliminate the requirement that a user learn several editors is similar to the common user interface standard previously offered by International Business Machines of Armonk, N. Y. This common user interface standard allowed the operating system manufacturer to set standards for commonly used commands such as "File Open" to allow all application programs to perform the task of opening files and other commonly used commands to operate in a similar manner. However, because the number of commands in an editor is significantly more than the number of commands which were defined by the standards, the problem of learning multiple command sets continues.

It is desirable to allow a user to integrate an editor of the user's choosing with an application, allowing a user to use a single editor for more than one application.

SUMMARY OF INVENTION

An integrator is used as an intelligent translator to communicate between one or more applications and one or more independent editors to allow the independent editors to provide integrated functionality with the applications. The integrator intercepts commands from one or more applications and adapts the commands for operation by an editor designated to operate with the application. Thus, the applications may communicate with the editors without the knowledge of the commands or formats that the editors require to carry out the desired action. The editor may be configured to send commands to the integrator for transmission to the application. Thus, an editor may provide integrated functionality with the application. The user may use one or more editors with multiple applications which provide functionality integrated with the editor. Thus, the benefits of an integrated editor may be realized without requiring the development or use of an application specific editor.

A BRIEF DESCRIPTION OF THE DRAWINGS

DETAILED DESCRIPTION OF A PREFERRED EMBODIMENT

Figure 1A:
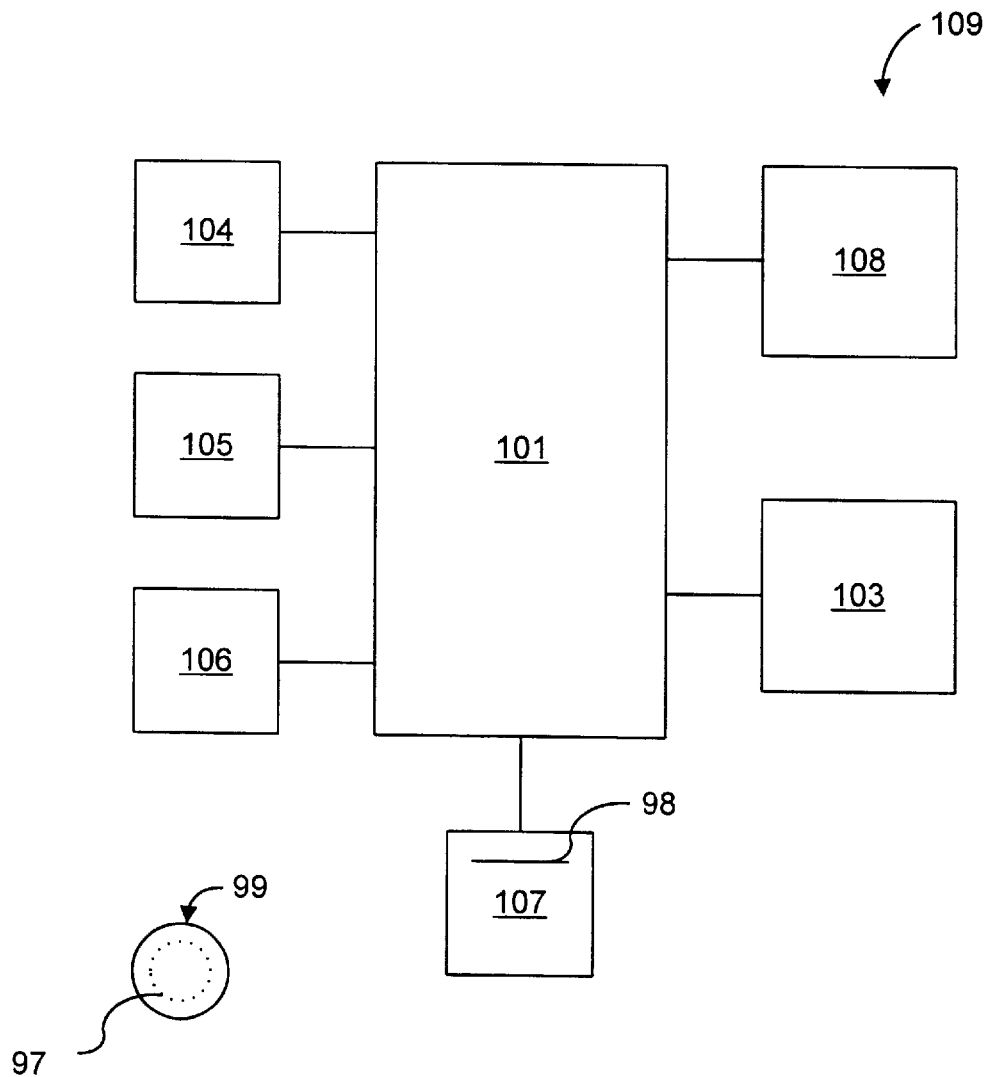
FIG. 1A is a block schematic diagram of a conventional computer system.

Referring now to Figure 1A, a conventional computer system 109 is shown. A processor 101 is coupled to a first storage system 108 such as RAM memory and a second storage system 103, such as a disk storage system. A user communicates with the system 109 using a keyboard 104 and a monitor 105 and in one embodiment, a pointing device 106 such as a mouse. Computer program product reader 107, such as a memory, hard drive, floppy disk drive or CD-ROM drive is coupled to processor 101 to allow computer readable program code devices 97 such as encoded bits of a computer program product 99 such as a memory, hard disk, floppy disk, CD-ROM or other storage device to be input to processor 101 and stored in memory 108 and/or disk storage 103 for use in controlling the operation of the computer system 109 when computer program product 99 is inserted into slot 98 of computer program product reader 107. An operating system is loaded into memory 108 or disk storage 103 or a combination of memory 108 and disk storage 103 and instructs processor 101 to load and execute applications or editors described below. In one embodiment, the computer readable code devices 97 are encoded to cause the computer system 109 to operate as described below.

Figure 1B:
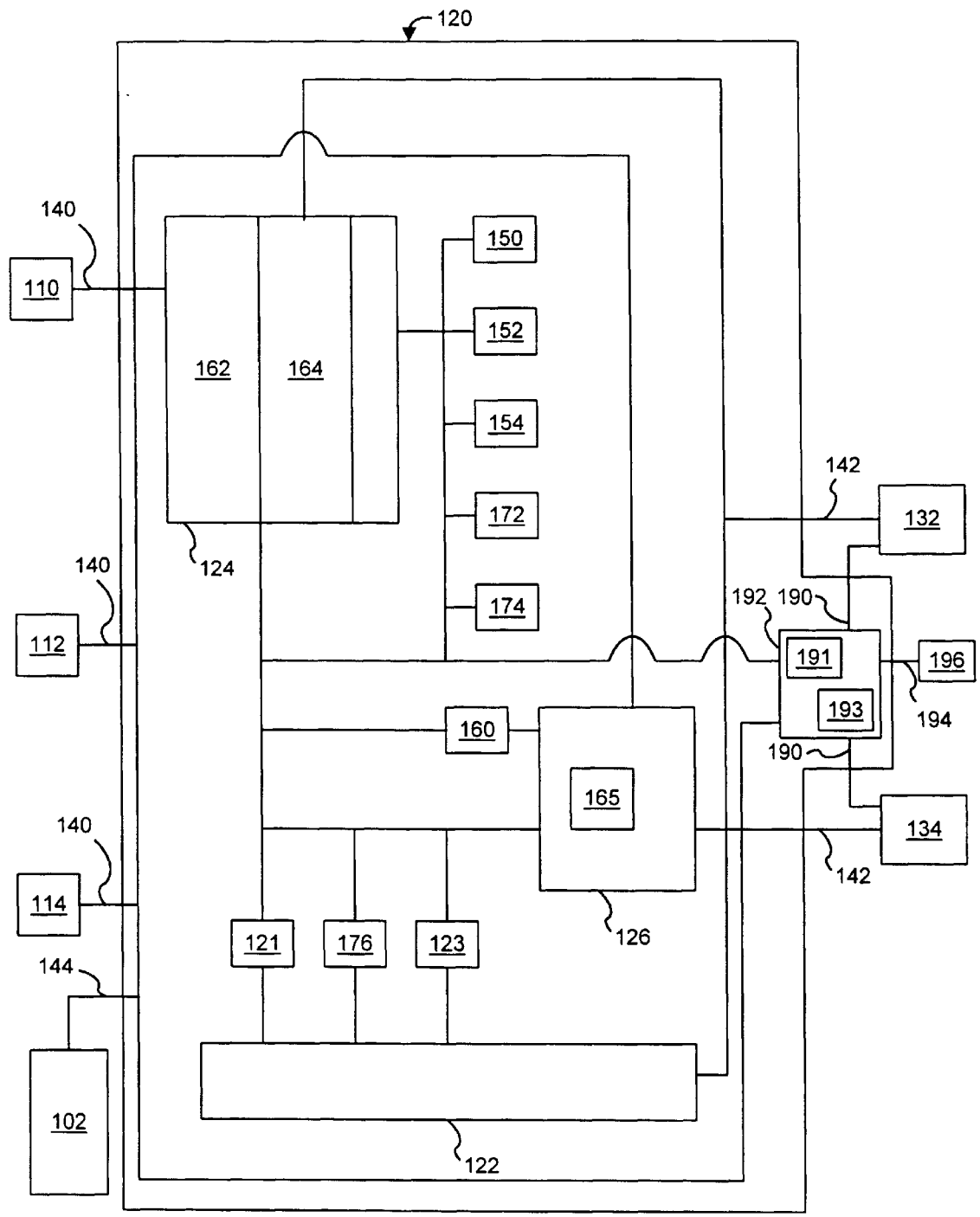
FIG. 1B is a block schematic diagram of an integrator coupled to multiple applications and multiple editors according to a first embodiment of the present invention.

Referring now to Figure 1B, one embodiment of three applications 110, 112, 114 which may be integrated with any of two editors using an integrator 120 according to the present invention is shown. Applications 110, 112, 114 are coupled to integrator 120 via application communication channels 140. Applications 110, 112, 114 may be any application which can send or receive some or all of the commands described below. Integrator 120 is coupled to editors 132, 134 via editor communication channel 142. Editors 130, 132 may be any editor or text editor, such as GNUEMACS available from Free Software Foundation of Cambridge, Mass., XEMACS available from the University of Illinois of Urbana, Ill. or VI, available commercially from Sun Microsystems of Mountain View, Calif. Communication channels 140, 142 may be established through conventional software parameter-passing techniques using the memory of a computer. In another embodiment, communication channels 140, 142 are established using interprocess communications, such as ToolTalk available commercially from Sun Microsystems, Inc., of Mountain View, Calif. In one embodiment, applications 110, 112, 114, integrator 120 and editors 132, 134 are implemented as computer programs running under the conventional Solaris operating system commercially available from Sun Microsystems, Inc., of Mountain View, Calif. on a conventional SPARCStation 10 microcomputer commercially available from Sun Microsystems, Inc., of Mountain View, Calif.

In the illustrated embodiment of Figure 1B, the integrator 120 is coupled to three applications 110, 112, 114 and two editors 132, 134. However, integrator 120 may be coupled to any number of applications 110, 112, 114, and any number of editors 132, 134, and the number of editor communication channels and application communication channels may be as few as one.

Figure 1C:
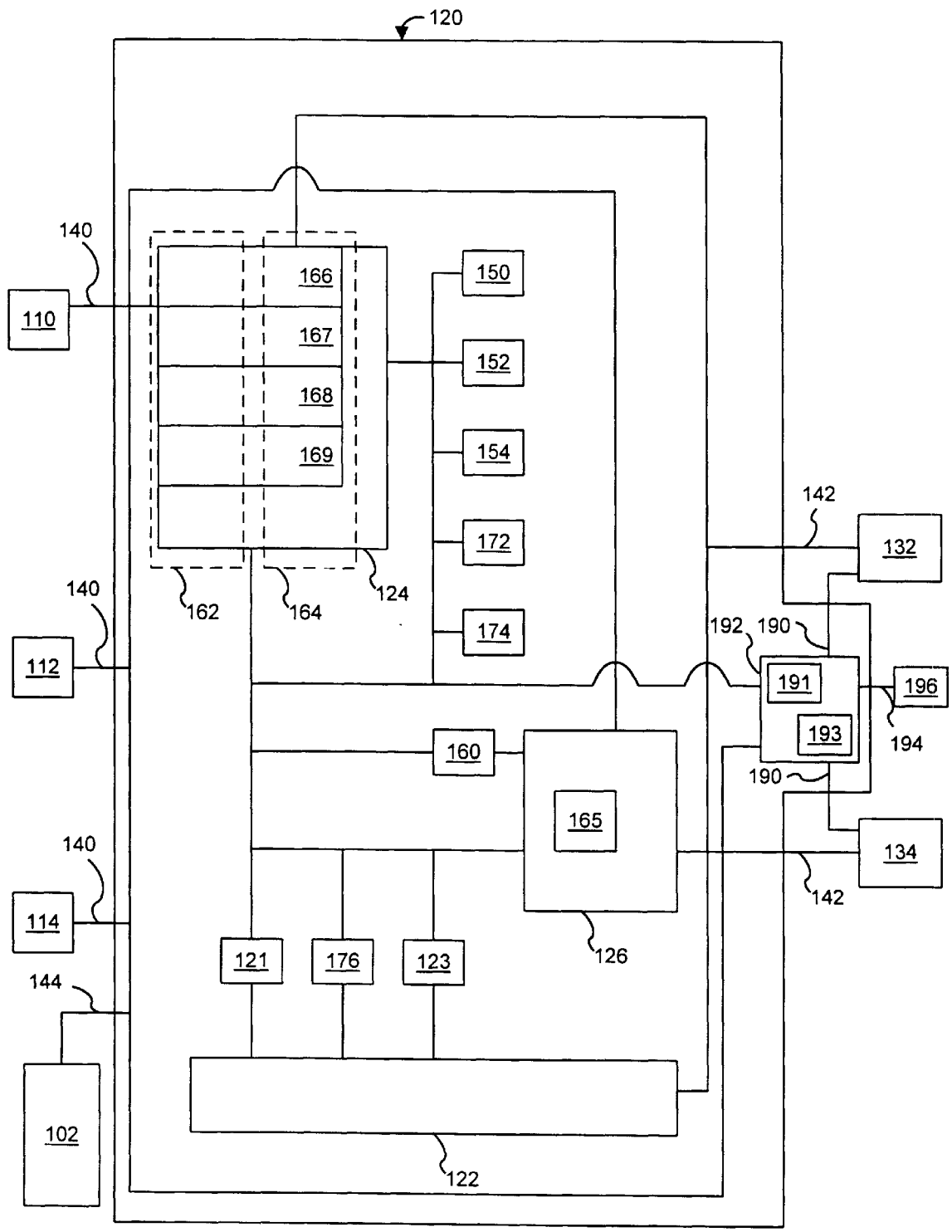
FIG. 1C is a block schematic diagram of an integrator coupled to multiple applications and multiple editors according to a second embodiment of the present invention.

In one embodiment, integrator 120 contains three modules, namely, a registration manager 122, an editor to application communicator (EAC) 126 and an application to editor communicator (AEC) 124. Application to editor communicator 124 contains an information manager 164 for managing certain information received by integrator 120, and editor command assembler 162 for assembling and sending certain commands to editors 132, 134 and the operating system 102. Referring momentarily to Figure 1C, in one embodiment, integrator 120 operates as the illustrated embodiment of FIG. 1B, except the functions of editor command assembler 162 and information manager 164 are dispersed among several modules 166, 167, 168, 169 organized by commands received by, and commands transmitted from integrator 120. Referring again to FIG. 1B, in one embodiment, integrator 120 may be a module contained in one or more of applications 110, 112, 114. In another embodiment, integrator 120 runs as a separate program or process.

1. Integrator Configuration Commands

In one embodiment, integrator 120 contains a registration manager 122, which in one embodiment, accepts commands described below from applications 110, 112, 114 and editors 132, 134 to allow applications 110, 112, 114 or editors 132, 134 to register with the integrator 120. In one embodiment, registration manager 122 allows the registration of other items, such as the appearance of glyphs, or pictures as described below.

Figure 2A:
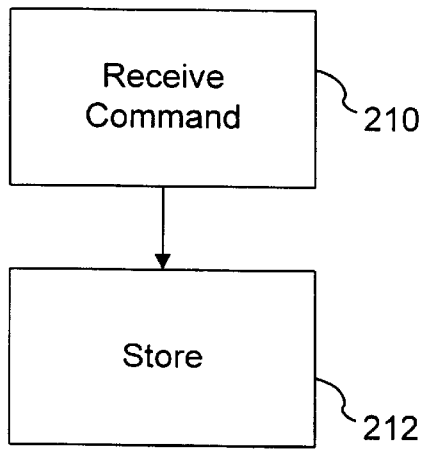
FIG. 2A is a flowchart illustrating a method of registration according to one embodiment of the present invention.

Referring now to FIG. 2A, a method of registering an item is shown. Registration commands are received which contain information about the item being registered 210. The item is registered by storing some or all of the information about the item as described below to provide later availability of the information 212.

Figure 2B:
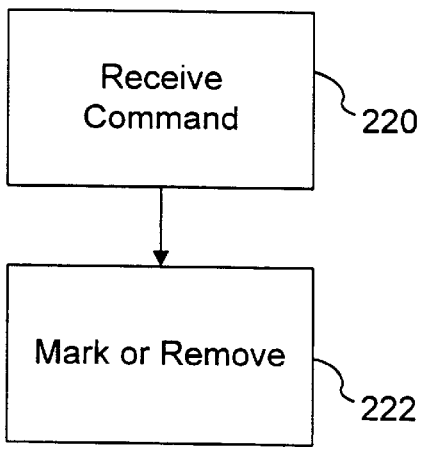
FIG. 2B is a flowchart illustrating a method of removing an item from registration according to the present invention.

Referring to FIG. 2B, a method of removing an item from registration is shown. A deregistration command is received indicating the item to remove from registration 220. The item is deregistered by marking or removing some or all of the information about the item 222.

a. Application Registration Commands.

Referring again to Figure 1B, in one embodiment, integrator 120 operates as software under a Solaris operating system 102 commercially available from Sun Microsystems Inc., of Mountain View, Calif. When the integrator 120 is loaded, for example by typing the path and executable filename of the integrator 120 to the operating system, integrator 120 registers itself with the operating system 102 using the Unix or Solaris "socket" command. When applications 110, 112, 114 are loaded by the operating system 102, applications 110, 112, 114 request a channel 140 to the integrator using the "socket" command of the operating system 102.

In one embodiment, software such as ToolTalk, available commercially from Sun Microsystems of Mountain View, Calif. handles the communication between applications 110, 112, 114 and integrator 120. ToolTalk intercepts the operating system request for communication, and arranges the communication channel 140. If the integrator 120 is not loaded when the application 110, 112, 114 requests the communication, ToolTalk instructs the operating system 102 to load and execute the integrator 120.

In one embodiment, when an application 110, 112, 114 voluntarily disconnects from the operating system 102, for example by sending a socket command, or if the operating system aborts the application 110, 112, 114 or detects that the application 110, 112, 114 has aborted operation, operating system 102 disconnects the channel 140 and removes some or all of the information associated with the application 110, 112, 114 or channel 140.

b. Editor Registration Commands.

In one embodiment, editors 132, 134 register with the registration manager 122 of the integrator 120 to establish the editor communication channel 142 and the type of commands the integrator 120 must use to communicate with the particular editor 132, 134. In one embodiment, editors 132, 134 send registration commands and information to the registration manager 122. In one embodiment, editor information includes the editor type and information about the editor communication channel 142 used to communicate with the editor 132, 134 being registered. The registration manager 122 stores the editor information in an editor registration table 121 for later use.

In one embodiment, when an application 110, 112, 114 first sends a command to the integrator 120 as described herein, integrator 120 prompts the user to select an editor 132, 134 from those registered with the integrator 120. In one embodiment, the selected editor 132, 134 is used for all applications 110, 112, 114, and the user is only prompted as a result of the first command from an application 110, 112, 114. The selected editor 132, 134 is noted by integrator 120 in application registration table 123. In another embodiment, the user is prompted to select an editor 132, 134 for each application 110, 112, 114 as a result of the first command from each application 110, 112, 114 to the integrator 120. Editor information may be stored by integrator 120 in application registration table 123 in this embodiment, to associate the selected editor 132, 134 with each application 110, 112, 114.

Figure 3A:
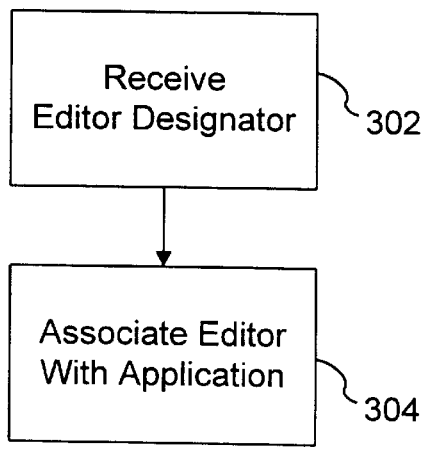
FIG. 3A is a flowchart illustrating a method of associating an editor with one or more applications according to one embodiment of the present invention.

Referring now to FIG. 3A, one embodiment of a method of associating an editor with one or more applications is shown. An editor designator is received from a user 302. The editor associated with the designator is associated with one or more applications 304, either by allowing the user to identify one or more applications with which the editor is to be associated, or by associating the selected editor with all of the applications the user uses.

Referring again to FIG. 1B, in one embodiment, editors 132, 134 may disconnect from the integrator 120 by sending a disconnect command to the registration manager 122. In one embodiment, the registration manager 122 removes the information about the editor which sent the command from the editor registration table 121. In another embodiment, the registration manager 122 marks the information in the editor registration table 121 to indicate deregistration of the editor.

c. Defining Glyphs.

Glyphs are small picture or icons which are used to create a visual indicator on a screen and are often used with integrated editors such as those integrated with debuggers to show the location of a breakpoint or program counter. In one embodiment, integrator 120 allows glyphs defined as described below to be used in the same manner. In one embodiment, glyphs are registered by registration manager 122 or redefined to allow for easy reuse as described below. In one embodiment, registration manager 122 receives a command to define a glyph from an application 110, 112, 114 via application communication channel 140. In one embodiment, the command is received via an operating system call to execute a registration module in registration manager 122. In one embodiment, registration manager 122 receives from application 110, 112, 114 via application communications channel 140 a character string containing the type of the glyph, which is a unique name for the glyph assigned by the application 110, 112, 114 registering it, a character string which holds the filename of the file containing the glyph, a boolean value which determines whether the glyph is to be highlighted using a color and an X-Windows color code containing the color used to highlight the glyph.

In one embodiment, glyph registration information received by registration manager 122 is stored in a glyph table 176 which holds the glyph type, a handle to the file containing the glyph, a bit representing whether the glyph is highlighted, and a code containing the highlighting color in each entry, one entry for each glyph registered. In one embodiment, glyphs are identified by a glyph handle obtained as described below. A handle is a token which identifies an item. Thus, the handle to a file contains the operating system identifier used to locate the file.

In one embodiment, after a glyph has been registered, a handle for the glyph may be located and returned for later use by an application 110, 112, 114 by sending to integrator 120 a command code for MarkTypeToIX and the type assigned by the application 110, 112, 114. Registration manager 122 uses the type to locate the glyph, and returns an integer handle for the glyph to the application 110, 112, 114.

Once the glyph is registered, it may be used and reused by several marks. In one embodiment, once a glyph is registered, it remains registered until integrator 120 terminates.

2. Application Instructions to the Editors

In one embodiment, an application 110, 112, 114 may direct the integrator 120 to instruct one or more editors 130, 132 to perform an operation using one or more editor integration commands. An editor integration command is a command for altering the display of an editor to correspond with the operation of an application to allow the editor to appear integrated with the application.

In one embodiment, as will be described below, applications 110, 112, 114 do not need to know the format and content of the editor-specific commands which will provide the integrated functionality. The information contained in application registration table 123 contains an identifier of one or more editors 132, 134 associated with the application 110, 112, 114. Integrator 120 uses the information stored in application registration table 123 to determine which editor or editors 132, 134 to send editor commands based upon the commands received from a particular application 110, 112, 114, or in one embodiment, which application 110, 112, 114 to send application commands based upon the commands received from a particular editor 132, 134. Integrator 120 uses the editor registration information stored in editor registration table 121 to convert the editor integration commands received from applications 110, 112, 114 to the format and content required by each editor 132, 134.

Figure 3B:
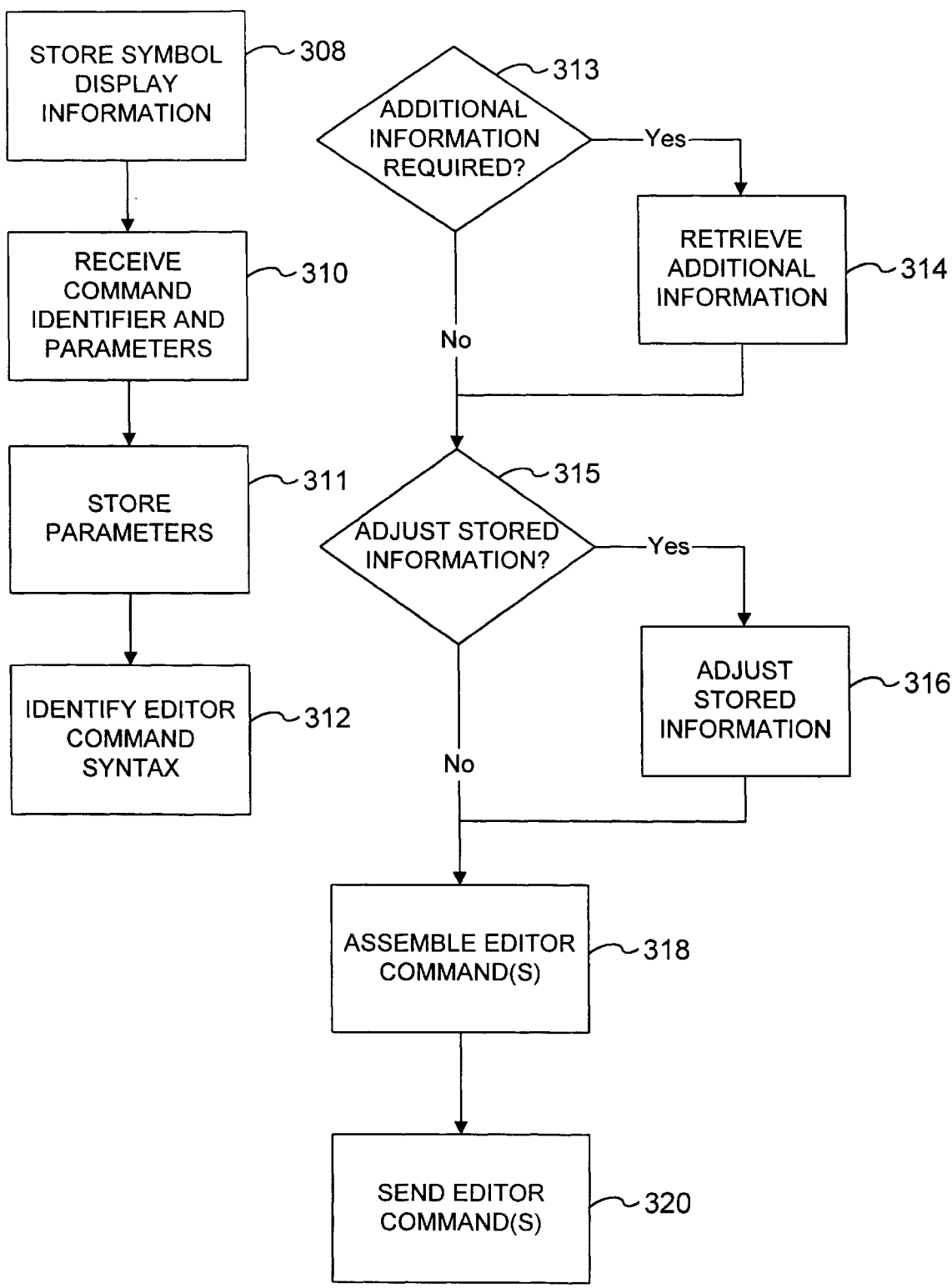
FIG. 3B is a flowchart illustrating a method of integrating an application with an editor according to one embodiment of the present invention.

Referring now to FIGS. 1B and 3B, one embodiment of a method of integrating an application with an editor is shown. Symbol display information is stored for later use 308. An editor integration command identifier, such as a code for a command described below, and associated parameters are received 310 and the editor's command syntax required to implement the command received is identified 312. The parameters received may optionally be stored 311. Such identification allows integrator 120 to provide integrated functionality between an application 110, 112, 114 and more than one editor. In one embodiment, the command identifiers are procedure calls to a module in the AEC 124 which directs the operation of the integrator 120 as described below. If additional information or any stored parameters are required to complete the editor's command syntax, such information is optionally located and retrieved from storage 313, 314. This information and additional information may be adjusted to reflect any new status information which may be inferred by the operation of the command 315, 316. The editor command required to implement the command received is assembled 318 and then sent 320 to the editor for execution. In another embodiment, the assembly step 318 is omitted and parts of the command are sent to the editor as they are identified.

In one embodiment, some command identifiers require a response. If such a command is received, one or more return parameters are sent to the application which sent the command identifier or to another application.

Referring again to FIG. 1B, in one embodiment, the above method is performed by an application to editor communicator 124, or AEC. The AEC 124 is coupled to the application communication channel 140 to allow the AEC 124 to receive commands sent by the applications 110, 112, 114. In one embodiment, the AEC 124 identifies the editor command syntax to be sent in response to the receipt of a command using a table of commands 160. The table of commands contains a list of many of the command identifiers and the syntax of the corresponding editor command for each editor 132, 134 with which the integrator 120 communicates. The table of commands 160 contains the editor commands and format of any common parameters which must be sent to the editor to perform the editor commands passed from the application 110, 112, 114 to the editors 132, 134 by integrator 120 as described below. The table of commands 160 need not be stored in AEC 124 in a table format, as the information may be interspersed in various memory locations. An editor command assembler 162 assembles the information described below to generate an editor command in a format according to the table of commands 160 allowing the command to be processed by an editor 132, 134. The editor command assembler 162 sends the editor command to editors 132, 134 via editor communication channel 142.

In one embodiment command identifiers are processed by AEC 124 to manipulate files, and process indicators known as marks and markers to provide certain integrated functionality between the applications 110, 112, 114 and editors 132, 134.

a. Editor File Manipulation Commands

In one embodiment, applications 110, 112, 114 may direct integrator 120 to instruct editor 132, 134 to load and display a particular stored computer system file.

In one embodiment, integrator 120 receives a "LoadFile" command identifier and a character string parameter containing the filename of the desired file from an application 110, 112, 114 via an application communication channel 140. For each application 110, 112, 114 communicating with the integrator 120, integrator 120 maintains additional information in a file list 150, 152, 154 containing a list of names of all files encountered by the editor which were used with the application, and handles to each file. Information manager 164 adds the file to a file list 150, 152, 154 of the application 110, 112, 114 which sent the command.

Editor command assembler 162 assembles and sends via editor communication channel 142 the appropriate editor command, such as the command described below, to the editor 132, 134 to instruct the editor to load the file. If the file is not in the file list 150, 152, 154 of the application 110, 112, 114 which initiated the LoadFile command, editor command assembler 162 build and sends to the editor 132, 134 associated with the application which sent the command using the application registration table 123 an editing command to load the file, and information manager 164 places the filename in the file list 150, 152, 154. If the file is in the file list 150, 152, 154, editor command assembler 162 builds and sends an editor command to editor 132, 134 to reload the file by first closing the previously opened and loaded version of the file and then reloading it as described below.

In one embodiment, editor 132 is the conventional XEMACS editor, adapted as described below and the editor command to load a file "filename", is: (eserve-load-file "filename").

In one embodiment, the editor 132, 134 must be adapted to accommodate the commands sent by the integrator 120. In one embodiment, editor 132 is a conventional XEMACS editor, and the sequence of commands listed in Appendix 1 is entered to the editor 132, 134 to allow the editor commands to perform the desired function. In one embodiment, the sequence listed in Appendix 1 is stored into a disk file in directory/home/user1/elisp, in the file ebo.el. The sequence is loaded into the conventional XEMACS editor using the following two XEMACS commands:

```
(setq load-path (append load-path ' ("/opt/SUNWspro/lib")))
(load "/home/user1/elisp/ebo.el")
```

In one embodiment, editor 134 is a conventional VI editor and the command to open a file "filename", is :e filename, and the command to close the current file is :q.

In one embodiment, if an application 110, 112, 114 directs integrator 120 to load a file, and no editor is loaded, integrator 120 prompts the user to select an editor, and editor command assembler 162 builds an operating system command to run the editor selected and sends the command to the operating system 102 using Operating System communication channel 144 to instruct the operating system to run the editor 132, 134 selected. The editor 132, 134 run is registered by registration manager 122 as described above.

In one embodiment, the operating system 102 is the Solaris operating system commercially available from Sun Microsystems of Mountain View, California, the editor 132 selected is a conventional XEMACS editor and the AEC calls the operating system to load XEMACS using the command,

```
xemacs −1 . . . /lib/eserve.el −f eserve-init
```

In one embodiment, an application 110, 112, 114 may instruct the editor to save or close a file using a "SaveFile" or "CloseFile" command. The application 110, 112, 114 sends the integrator 120 the command identifier and a text string parameter containing the filename via application communications channel 140, and the command assembler 162 builds and sends via editor communications channel 142 to an editor 132,134 associated with the application using the application registration table 123 the close file command as described above. In one embodiment, if a file is closed, information manager 164 adjusts the stored information by removing the file from the appropriate file list 150, 152, 154.

Some editors 132, 134 do not allow a file that has been changed to be closed without asking the user whether to save the file before closing it. In one embodiment, the application 110, 112, 114 can instruct the integrator 120 via a parameter to instruct editor 132, 134 to force the file to be closed even if it is not saved, without prompting the user, by sending the CloseFile command along with this parameter. Editor command assembler 162 builds the editor command as described below and information manager 164 removes the file from the file list 150, 152, 154. In one embodiment, editor 132 is a conventional XEMACS editor, adapted as described above, and an editor command to close a file "filename", without prompting the user to save is:

(eserve-quit-file "filename" t)

Some editors 132, 134 allow multiple files to be opened and displayed on cascaded windows, with the currently active document displayed in front of the others. The conventional XEMACS editor allows this feature, but the conventional VI editor does not. A file may be moved to the front with the "Front" command. An application 110, 112, 114 may instruct the integrator 120 to move a file to the front by sending to integrator 120 via editor communications channel 142 the command identifier and a text string parameter containing the file to place in front. The information manager 164 verifies the file is in the File List 150, 152, 154 and if so, editor command assembler builds and sends the appropriate command code and file identifier to the editor 132, 134 via editor communications channel 142. In one embodiment, editor 132 is a conventional XEMACS editor, adapted as described above and the editor command to move the file "filename", to the front is: (eserve-front-file "filename").

In one embodiment, if the file is not open, the integrator 120 first opens it as described above. In another embodiment, if the file is not open, the integrator 120 may indicate an error to the application 110, 112, 114 which sent the Front command by sending an error code to the application 110, 112, 114 via the application communication Channel 140. In another embodiment, if the file is not open integrator 120 will indicate an error to the user.

In one embodiment, the application 110, 112, 114 can instruct the integrator 120 to display a particular line in a file using a "GoToLineNo" command. An application 110, 112, 114 sends via editor communications channel 142 to the integrator 120 the command identifier, a text string parameter containing the filename and a text string or integer parameter indicating the line number of the file to be displayed. Editor command assembler 162 builds and sends the appropriate editor command to the editor 132, 134 to cause the indicated line number and a portion of text before or after the indicated line number to be displayed to the user as described below. In one embodiment, if the indicated file is not presently displayed in front of the other windows as described above, the "front" command described above is assembled and sent to the editor 132, 134, by the editor command assembler 162 to place the file in the front window.

In one embodiment, editor 132 is a conventional XEMACS editor, adapted as described above and the editor command to go to a line number nnn in the file "filename" is (eserve-goto-line "filename" nnn).

b. Marks

It is often desirable to allow for the display of indicators in a file, in addition to the text which is present. Such indicators are referred to as marks. In one embodiment, marks remain adjacent to specified text. If the adjacent text is deleted, some editors delete the mark, but other editors, such as the VI editor, place the mark at the top of the file. As other text is inserted or deleted in front of the mark, the mark will move along with the adjacent text. In one embodiment, marks are used to display small pictures, or "glyphs" to indicate to the user of the editor 132, 134 the location of a particular item. For example, a user of a debugger application 110, 112, 114 may see the location of one or more breakpoints in a file while the user edits the file using editor 132, 134.

In one embodiment, a mark may have an appearance, such as invisible, or highlighted, may have a glyph, or small picture to indicate its location, and may even have a text portion displayed nearby, such as in a footer of the display. In one embodiment, these properties are displayed only when the portion of the file near the mark is displayed.

In one embodiment, marks are inserted into a file by applications 110, 112, 114. The application 110, 112, 114 may instruct the integrator 120 to direct the editor how and where to display the mark, may change the appearance of the mark, or may delete the mark.

In one embodiment, editors 132, 134 are capable of displaying only those marks which have been registered by an application 110, 112, 114 using the "AddTermGlyph" command described below.

In one embodiment, a mark is inserted into a file by an application 110, 112, 114 using the "AddMark" function. The application 110, 112, 114 sends the integrator 120 via editor communications channel 142 the command identifier for AddMark, a character string parameter containing the filename of the file into which the mark will be inserted, an integer parameter containing the line number in the file into which the mark is to be inserted, an integer parameter containing the column in the line into which the mark is to be inserted, an integer parameter containing the handle to the glyph, obtained via the MarkTypeToIX command described above, and a character string parameter containing a message to be displayed in a footer or elsewhere. In one embodiment, information manager 164 locates the glyph in the glyph table 176 using the handle parameter received and editor command assembler 162 assembles an editor command to place the mark in the file as described below. Editor command assembler 162 sends the editor commands assembled to the editor 132, 134 via editor communication channel 142. In one embodiment, editor 132 is a conventional XEMACS editor, adapted as described above which inserts a mark having a name "marknamel" having a type marktype, at line number nnn in the file "filename" in response to the following editor command:

(eserve-set-mark "filename" nnn markname marktype)

The AEC 124 returns a handle to the mark to the application 110, 112, 114 which sent the command identifier via application communication channel 140 for future use as described below.

As described below, in one embodiment, applications 110, 112, 114 refer to marks using a handle, and editors 132, 134 refer to marks using names. AEC 124 translates between the mark name provided used by the editor, and the handle to the mark used by an application 110, 112, 114. In one embodiment, information manager 164 maintains a list of the name of each mark and associated handles for each file in one or more mark lists 172, 174 and each mark list is associated with a file via a pointer in the file list. AddMark causes the information manager 164 to insert a mark entry into the mark list 172, 174.

In one embodiment, an application 110, 112, 114 may direct integrator 120 to instruct an editor 132, 134 to display a portion of a file containing a particular mark added using the Addmark command described above. Such a capability is used in one embodiment where the application 110, 112, 114 is a debugger which stops execution because the debugger application 110, 112, 114 has reached a breakpoint, and wishes to display to the user the breakpoint glyph and the breakpoint code near the breakpoint glyph. In one embodiment, the footer text line associated with the mark is also displayed. The application 110, 112, 114 requests the integrator 120 to display the portion of the file near the mark using the "GoToMark" command. The application sends to integrator 120 via editor communications channel 142 the command identifier for the GoToMark command, and a parameter containing the handle to the mark. Information manager 164 looks up the mark, including the footer text, in the mark list 172, 174 corresponding to any file in the file list 150, 152, 154 for the application 110, 112, 114 which sent the command. Information manager 164 uses the mark list 172, 174 to identify the mark name used by the editor 132, 134, and editor command assembler assembles and sends via editor communication channel 142 named command to instruct the editor 132, 134 to display the mark, including its associated footer text, and a portion of the file adjacent to the mark having such name. In one embodiment, editor 132 is a conventional XEMACS editor, adapted as described above, and the editor command to display the mark named "mark-id" and a footer message "message" is:

(eserve-goto-mark "filename" mark-id "message")

However, not all editors possess the ability to embed a glyph and footer text in a mark as described above using the AddMark command. For example, the conventional VI editor does not have the ability to display glyphs and a text footer. In one embodiment, integrator 120 provides this capability through a terminal display filter 192. In this embodiment, editor command assembler 162 inserts a special sequence of characters in place of the mark. In one embodiment, the sequence is an escape sequence, a sequence of characters beginning with the ASCII code for escape, decimal 27. In one embodiment, editor 134 is a conventional VI editor, and the command to insert an escape sequence in a file is the ASCII code for escape, followed by the sequence. In one embodiment, the sequence is [Gnnn where nnn is the mark identifier.

In one embodiment, information manager 164 stores the sequence of characters after the escape in the mark list 172, 174 to associate the marks represented by escape sequences with the sequence. Display filter 192 has an input 190 coupled to receive the display output of editor 134. When escape code detector 191 of display filter 192 detects the escape ASCII code, it requests the mark information from information manager 164. If the sequence is in the mark list 172, 174, the information to be inserted into the display, including the handle to the glyph file, is returned by information manager 164 to display inserter 193, which substitutes the mark information at the appropriate position in the display filter output 194 to include the desired mark. Display filter output 194 is coupled to the input of a conventional terminal driver 196 which produces the display. If information manager 164 indicates that the escape sequence is not stored in the mark list 172, 174 for the file displayed, display filter does not remove the escape sequence, instead passing it unchanged to display filter output 194 and to terminal driver 196.

In one embodiment, an application 110, 112, 114 instructs the integrator 120 to delete a mark using the "DeleteMark" command. The application 110, 112, 114 sends via editor communications channel 142 to the integrator 120 the command identifier for DeleteMark, and a parameter containing the handle of the mark, such as the handle received during AddMark described above. Information manager 164 deletes the mark from the mark list 174, 176 and editor command assembler 162 removes the mark from the file by assembling an editor command to locate and delete the mark and sending the command to the editor 132, 134 via editor communication channel 142. In one embodiment, editor 132 is a conventional XEMACS editor, adapted as described above, and the editor command to locate and remove a mark from the file "filename" is: (eserve-delete-mark "filename" markname)

In one embodiment, an application 110, 112, 114 may change the glyph displayed on a mark using the "EditorChangeMarkType" command. The application 110, 112, 114 sends via editor communications channel 142 the Command identifier for the EditorChangeMarkType command to integrator 120 along with parameters containing the handle of the mark to be changed and information regarding the change. In one embodiment, this information includes the glyph type of the new glyph to be displayed at the mark. Information manager 164 locates the mark in the mark list 172, 174 and appropriately adjusts the information in the mark list 172, 174 to accommodate the information changed. The command to update the glyph or character sequence corresponding to the glyph is assembled and sent by editor command assembler 162 to editor 132, 134 via editor communication channel 142 for display to the user. In one embodiment, editor 132 is a conventional XEMACS editor, adapted as described above, and the editor command to adjust the glyph attached to the mark named "markname" in file "filename" to the type "marktype" is: (eserve-change-mark-type "filename" markname marktype).

In one embodiment two types of indicators, marks and markers, may be displayed Marks are not expected to move relative to a position in the file, but may be copied to multiple locations in the file. For example, a debugger breakpoint is rarely moved, and there may be multiple breakpoints in a file. The command structure of marks described above is optimized for glyphs which are copied more often than they are moved. In one embodiment such as that described above, once defined, a mark may be duplicated with a single command, but it takes two commands, one to delete the mark, another to add it to the new location, to move a mark.

Markers are similar to marks, but are expected to move relative to a particular position in the file more often than a mark. In one embodiment, a debugger program counter is a marker, as the program counter would be expected to move around from time to time. While a mark may be moved by first deleting it and then adding it to a new location, a marker may be moved merely by indicating its new location as described below. Thus, in one embodiment the command structure associated with a marker takes only one command to move a marker, but two to copy the marker.

In one embodiment, markers are maintained in the mark lists 172, 174 by information manager 164 just as marks are maintained. In another embodiment, a separate marker list is maintained. The present invention does not require the commands for both marks and markers, though having both sets of commands can make certain applications 110, 112, 114 easier to program and faster to operate.

Glyphs for markers are registered and indexed using the AddTermGlyph and MarkTypeToIX procedures described above. A marker is created using the "NewEditorMarker" command. Applications 110, 112, 114 send to integrator 120 via editor communications channel 142 the command identifier for NewEditorMarker and the type, or application-generated name of the marker as a parameter. AEC 124 inserts a marker in the same manner that AEC 124 inserts a mark as described above.

In one embodiment, markers are deleted using the "DeleteEditorMarker" command. Applications 110, 112, 114 send to integrator 120 via applications communications channel 140 the command identifier for DeleteEditorMarker and the handle to the marker received as described above. Markers are deleted in the same fashion as the deletion of marks described above.

In one embodiment, the location of a marker is defined and changed using the "EditorMarkerSetLocation" command. Applications 110, 112, 114 send AEC 124 via application communications channel 140 the command identifier for EditorMarkerSetLocation and parameters including the handle to the marker, a character string containing the filename in which to move or insert the marker, an integer line number in the file in which to insert the marker, and an integer column number in which to insert the marker. Information manager 164 uses the handle to the marker to identify whether such marker is in the marker list. If a match is found, the previous location of the marker is noted, and editor command assembler 162 assembles a first editor command to remove the marker from the editor. Information manager 164 replaces the old location of the marker with new location of the marker in the marker list and editor command assembler 162 assembles a second editor command to insert the marker in the specified location. In one embodiment, editors 130, 132 require only a single command to adjust the location of the marker. In such embodiment, only this single command is assembled by AEC 124. In another embodiment, AEC must assemble separate commands to delete the old mark and add the new mark as described with the "DeleteMark", "AddMark" and, in one embodiment, "GotoMark" commands, although the Goto-Mark command is not required. The editor command assembler sends via editor communications channel 142 the commands it assembles to the editors 132, 134 associated with the applications 110, 112, 114 as maintained by information manager 162 in the application registration table 123.

In one embodiment, the display of a marker may be suspended by the editor yet retained in the marker lists using a "EditorMarkerDeleteMark" command. Applications 110, 112, 114 send the command identifier via application communications channel 140 to AEC 124 along with a handle to the marker as a parameter. Information manager 164 uses the marker handle to identify the marker in the file and indicate its new status as not displayed. Editor command assembler 162 assembles an editor command to delete the marker from the editor 132, 134 associated with the application which sends the command identifier as maintained by information manager 164 in the application registration table 123.

3. Editor-Communicated User Instructions to the Application

In one embodiment, editors 132, 134 send information to integrator 120. This information is either status messages or user generated commands. An editor to application communicator, EAC 126 receives and processes these messages.

a. Status Messages

Integrator 120 may receive from editors 132, 134 messages regarding the name and version of an editor 132, 134 coupled to the integrator 120 soon after the editor 132, 134 establishes the connection, and a message from an editor 132, 134 once the editor terminates the connection, usually upon response from a command from the user to terminate the connection. Upon receipt of a termination of connection message, EAC 126 utilizes its own information manager 165 to remove the editor from the editor registration table 121. In one embodiment, if a command is later sent by an application associated with the terminated editor, AEC 124 will restart the editor. In one embodiment, editor 132 is a conventional XEMACS version mm.mm editor running protocol version n, which provides a status messages in the following format:

connected xemacs n mm.mm

Integrator 120 may receive information about the presently displayed file from each editor 132, 134. Such information includes whether the file was loaded, unloaded or saved, and whether the file was modified. In one embodiment, information manager 165 modifies this information stored in the file lists 150, 152, 154 as required. The formats of the status messages received from a conventional XEMACS editor are as follows:

loadedFile filename to indicate a file was loaded;

deletedFile filename to indicate that a file was closed. Contrary to the suggestion of the nomenclature, this message is not generally used to indicate the file was deleted;

savedFile filename to indicate the file was saved; and modified filename to indicate the file has been modified. Integrator 120 uses the information received from the first two messages to determine if a file is opened, and the last two messages to identify files which have been modified but not saved, so as to allow integrator 120 to prompt the user if a file is about to be closed for which integrator 120 has received a "modified" status message without receiving a later "savedFile" message.

b. User-Generated Commands

Figure 4A:
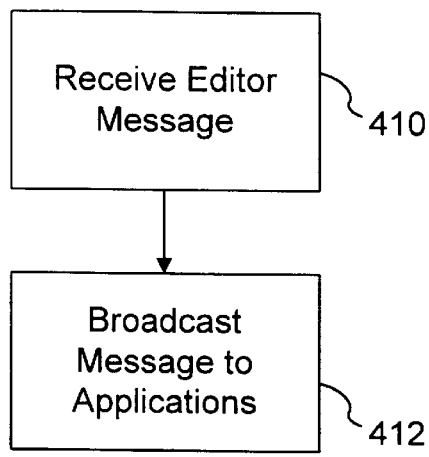
FIG. 4A is a flowchart illustrating method of processing editor messages according to one embodiment of the present invention.
Figure 4B:
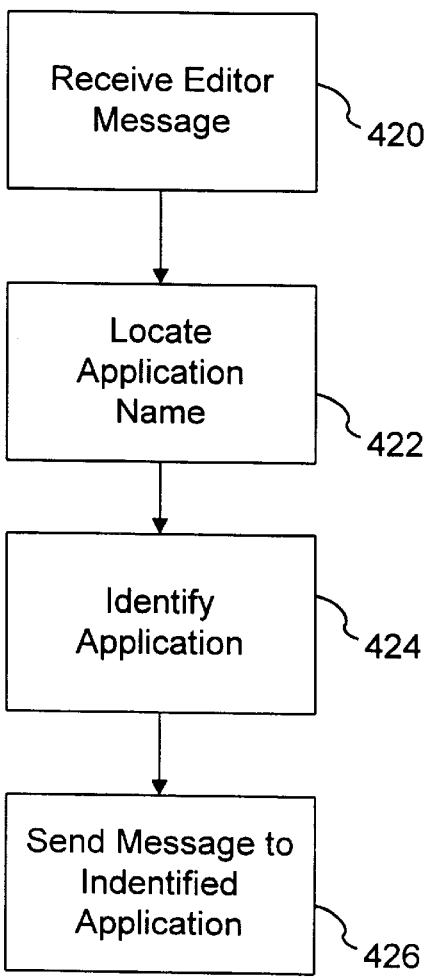
FIG. 4B is a flowchart illustrating a method of processing editor messages according to a second embodiment of the present invention.

Integrator 120 receives and process messages received from the editors 132, 134 via editor to application communicator 126. Referring now to FIG. 4A, one embodiment of a method of processing editor messages is shown. Editor messages are received 410 and all editor messages received are broadcast to all applications 412. Each application must parse the message to determine if the message was intended for that application. Referring now to FIG. 4B, another embodiment of a method of processing editor messages is shown. Application names are received, stored and associated with an application corresponding to the application name. A message is received from an editor 420, and the message is parsed to locate an application name 422. The application name is located in the stored application names and the application having the name is identified 424. If an application having the name is identified, a portion or all of the message is sent to the identified application 426.

Referring again to FIG. 1B, in one embodiment, integrator 120 receives user generated commands from editors 132, 134 via editor communications channel 142 and transfers the commands to applications 110, 112, 114 via application communications channels 140. Integrator 120 may optionally translate the commands from the format received from editors 132, 134 to that required by the applications 110, 112, 114, but as is shown below, each editor 132, 134 may be configured to send the user generated commands in the proper format and having the proper content for each application 110, 112, 114.

In one embodiment, editors 132, 134 may be configured by the user to allow short keystroke sequences to send a command to integrator 120. In one embodiment, editor 132 is a conventional XEMACS editor and the following command sequences are entered to the editor to configure the editor to send commands to integrator 120:

```
(defun ipe-set-function-keys ()
    (global-set-key ' [f3] ' ipe-build)
    (global-set-key ' [f4] ' ipe-next-error)
(eserve-add-fkey-function ' ipe-set-function-keys)
(defun ipe-build ()
    (interactive)
    (eserve-send-verb "build.build"))
(defun ipe-next-error ()
    (interactive)
    (eserve-send-verb "build.next-error"))
```

In one embodiment, the above sequence is stored into a disk file in directory/home/user1/elisp, in the file ipe.el. The sequence is loaded into the conventional XEMACS editor using the following two XEMACS commands:

```
(setq load-path (append load-path ' ("opt/SUNWspro/lib")))
(load "/home/user1/elisp/ipe.el")
```

Two commands are defined with the sequence above by a conventional XEMACS editor 132. One command sends to the integrator 120 via editor communications channel 142 a character string "build.build" when the F4 keyboard function key is pressed by an XEMACS user. The second command sends to integrator 120 the character string "build.next-error" when the f4 keyboard function key is pressed by a user. This information is parsed by the application 110, 117, 114 in one embodiment, and the integrator 120 in another embodiment as described above. The portion of the string to the left of the period contains information about the application for which the command is intended. The portion of the string to the right of the period describes the action desired by the user.

In one embodiment, EAC 126 accepts some of the user-generated commands and itself performs the desired actions. For example, an open-file command may instruct the integrator 120 to insert a new file in a file list 150, 152, 154 after the editor 132, 134 opens the file upon request by the user using another function key.

Appendix 1

```
;; eserve.el --- Implements Emacs side of ESERVE-Emacs
interface.

;; Copyright (C) 09 Jun 1995  Sun Microsystems, Inc.

;; Created:    July 1994

;; Version:    1.68
```

```
;; Header:     @(#) eserve.el: v1.68 95/06/09 17:20:30

;; Keywords:   ESERVE GNU Emacs XEmacs integation

;;; To Do:

;; Replace use of after-change-function with after-change-functions

;;
;; User settable variables
;;

;; NOTE: If the user would rather the fkeys be left alone,
;; then the variable eserve-bind-fkeys should be set to nil (before
;; emacs connects to the application)
;;
(defvar eserve-bind-fkeys t "if t, adds bindings for function keys")

;;
;; %%%%%%%%%%%%%%%%%%%% user section ends %%%%%%%%%%%%%%%%%%%%
;;
```

```
    (require 'cl)                          ;Common Lisp
compatibility

;;
    ;; Global variables
    ;;
    ;; Create and initialize global variables
    ;;
    (defvar eserve-connection nil "ESERVE process object")

(defvar eserve-app-name nil "name of application
attached to emacs")

(defvar eserve-protocol-version 2 "Version of the
protocol to ESERVE")

;; Determine whether we are running GNU Emacs v19 or
XEmacs.

(defvar running-xemacs nil "t if we're running XEmacs")

(defvar running-emacs  nil "t if we're running GNU
Emacs 19")

(if (string-match "^19\..*\\(XEmacs\\|Lucid\\)" emacs-
version)

(setq running-xemacs t)

(setq running-emacs  t))

;; We need to use prime numbers here (e.g. 127, 509,
...) to reduce the likeli-

;; hood of collisions.
```

- 41 -

```
(defvar eserve-buffers-marks-size 127 "Initial size of
buffers-mark vectors list")

(defvar eserve-mark-vector-chunk  127 "Size of eserve-
mark-vector chunk")

(defvar eserve-buffers-marks-list (make-hash-table :test 'eq :size eserve-buffers-
marks-size)

"Hash table containing buffers and their associated
mark vectors")

(defvar eserve-message-leftover nil "contains partial
message saved across buffer sends from eserve")

(defvar eserve-mark-type-list nil "the list of mark
types which describe the visible properties of a mark")

(defvar eserve-current-toolbar nil "The current ESERVE
toolbar")

(defvar eserve-toolbar-icon-height 25 "height of
toolbar icons")

(defvar eserve-frame-previous-toolbar-alist nil "list
of frames and toolbar info")

(defvar eserve-toolbar-table nil

"A vector of vectors which holds the descriptions of
toolbar items.

Each toolbar items comprises 0   file..........(string) the pixmap filename
```

```
    1  verb..........(string) the verb (action) to be
performed 2  help..........(string) the help text to display
when over the icon 3  needsFilePos..(boolean) indicates if file position
should also be sent with the verb 4  offset........(integer) the spacing (in pixels) to
the previous icon or edge.  This is treated
as a hint by Emacs and may be rounded up or down
modulo pixels/default-character-
width.

5  label........(string) a label to use if an icon
can't be created.")

(defvar eserve-fkey-functions nil

"list of name of applications binding fkeys")

(defvar eserve-startup-file nil "file contains code to
connect app/emacs")

(defvar eserve-startup-envvar
"SPRO_EDITOR_RENDEZVOUS_FILE" "env var whose value indicates
the startup file")

(defvar eserve-menus nil "list of app-defined menus")

(defvar eserve-verb-hash-size 127 "initial size of
eserve-verb-button-hash table")

(defvar eserve-verb-button-hash
```

- 43 -

```
        (make-hash-table :test 'equal :size eserve-verb-hash-size)

"Hash table containing verb strings and their
associated buttons")

(defvar eserve-vc-next-op-item nil "holds VC next
operation menu item")

(defvar eserve-vc-teardown-menu nil "if t, tear down VC
menu at cleanup time")

;;
        ;; Debugging and tracing
        ;;

(defvar eserve-log-buffer nil "log for eserve/emacs
message traffic")

(cond
          ((getenv "HB_DEBUG")
            (setq debug-on-error t)
            (setq eserve-log-buffer (get-buffer-create " *eserve-log*"))))

(defun eserve-log-text (string)
          (cond
            ((and eserve-log-buffer
               (buffer-name eserve-log-buffer))
             (save-excursion
               (set-buffer eserve-log-buffer)
               (goto-char (point-max))
```

```
        (insert string)))))

;;
;; eserve initialization
;;
(defun eserve-init ()
    "Initializes Emacs for communication with ESERVE.
This function is called from
    the command line which invokes Emacs."
    (eserve-log-text (format "%s started.\n" emacs-version))
    (eserve-log-text (format "%s\n" command-line-args))

;; GNU Emacs 19 - XEmacs compatibility
    (unless (fboundp 'raise-frame) (fset 'raise-frame
'raise-screen))
    (unless (fboundp 'window-frame) (fset 'window-frame
'window-screen))

;; Choose the correct overlay-or-extent creation &
deletion functions.
    (when running-xemacs
        (defalias 'eserve-vc-setup 'eserve-xemacs-vc-setup)
        (defalias 'eserve-vc-cleanup 'eserve-xemacs-vc-cleanup)
        (defalias 'eserve-add-menus 'eserve-xemacs-add-menus)
        (defalias 'eserve-delete-menus 'eserve-xemacs-delete-menus)
```

- 45 -

```
        (defalias 'eserve-create-overlay-or-extent 'eserve-
xemacs-create-extent)

(defalias 'eserve-delete-overlay-or-extent 'eserve-
xemacs-delete-extent)

(defalias 'eserve-set-overlay-or-extent    'eserve-
xemacs-set-extent))

(when running-emacs (defalias 'eserve-vc-setup 'eserve-emacs-vc-setup)

(defalias 'eserve-vc-cleanup 'eserve-emacs-vc-
cleanup)

(defalias 'eserve-add-menus 'eserve-emacs-add-
menus)

(defalias 'eserve-delete-menus 'eserve-emacs-
delete-menus)

(defalias 'eserve-create-overlay-or-extent 'eserve-
emacs-create-overlay)

(defalias 'eserve-delete-overlay-or-extent 'eserve-
emacs-delete-overlay)

(defalias 'eserve-set-overlay-or-extent    'eserve-
emacs-set-overlay))

;; Make the function which is run after a change in a
buffer local to that

;; buffer.

(make-variable-buffer-local 'after-change-function)
;TBD: Obsolete

;; Create a new face with which to highlight errors,
etc.

(copy-face 'default 'eserve-highlight)
```

```
    (eserve-xpm-setup)

(eserve-vc-setup)

;; load startup file if it exists (let ((startup-file nil))
       (cond
         ((setq eserve-startup-file (getenv eserve-startup-
envvar))
          (eserve-load-startup-file)
          (setenv eserve-startup-envvar nil)))))

;;
    ;; eserve process communication functions
    ;;

(defun eserve-connection-filter (process output)
      "Handles output from eserve process."
      (set-process-filter eserve-connection t)
      (unwind-protect
          (condition-case err-msg
            (progn
              (eserve-log-text (format "%s" output))
              (eserve-eval-cmds output))
          (error
           (progn
```

```
            (message (format "Error: %s - occurred during
eserve msg evaluation" err-msg))

(eserve-log-text (format "Error: %s - occurred
during eserve msg evaluation\n" err-msg)))))

(set-process-filter eserve-connection 'eserve-
connection-filter))

(set-process-filter eserve-connection 'eserve-
connection-filter))

(defun eserve-connection-sentinel (process status)

"Handles changes in status to ESERVE process."

(cond ((memq (process-status process) '(signal exit
closed))

(cond (eserve-app-name (message (format "connection to %s terminated"
eserve-app-name)))

(t (message "connection to eserve termintated")))

(eserve-connection-cleanup))))

(defun eserve-connection-cleanup ()

"Cleans up after ESERVE connection is broken"

(eserve-cleanup)

(setq eserve-connection nil))

(defun eserve-cleanup ()
```

```
        "Cleans up ESERVE related information"

(eserve-clear-all-marks)

(remove-hook 'kill-buffer-hook 'eserve-kill-buffer-
hook)

(remove-hook 'find-file-hooks 'eserve-find-file-hook)

(remove-hook 'after-save-hook 'eserve-after-save-
hook)

(remove-hook 'first-change-hook 'eserve-first-change-
hook)

(clrhash eserve-buffers-marks-list)

(setq eserve-mark-type-list nil)

(setq eserve-message-leftover nil)

(setq eserve-app-name nil)

(eserve-delete-menus eserve-menus)

(clrhash eserve-verb-button-hash)

(eserve-xpm-cleanup)

(eserve-toolbar-cleanup)

(eserve-vc-cleanup)

(cond
          (running-emacs ;; menu removal bug
            (redraw-display))))

(defun eserve-quit ()
        "aborts currently launching application and
disconnects from it"
        (eserve-launch-timer-reset)
```

```
        (cond
         (eserve-launch-process
           (delete-process eserve-launch-process)
           (eserve-launch-process-cleanup)))
        (cond
         (eserve-connection
           (delete-process eserve-connection)))
        (eserve-connection-cleanup))

(defun eserve-xpm-setup ()
        "sets up the xpm-color-symbols list"
        (when running-xemacs
            (cond
             ((not (assoc "FgColor" xpm-color-symbols))
              (setq xpm-color-symbols
                    (append (list
                             '("FgColor" (face-foreground 'default))
                             '("BgColor" (face-background
'default)))
                            xpm-color-symbols))))))

(defun eserve-xpm-cleanup ()
        "restores the xpm-color-symbols list"
        (cond
         (running-xemacs
```

```
        (let ((bg-color-attr (assoc "BgColor" xpm-color-
symbols))

(fg-color-attr (assoc "FgColor" xpm-color-
symbols)))

(cond (bg-color-attr (setq xpm-color-symbols (delq bg-color-attr xpm-
color-symbols))))

(cond (fg-color-attr (setq xpm-color-symbols (delq fg-color-attr xpm-
color-symbols))))))))

(defun eserve-toolbar-cleanup ()

"restores emacs to the pre-eserve-toolbar state"

(cond (running-xemacs (cond (eserve-use-bb-toolbar ;; - 19.11

(cond ((fboundp 'toolbar)

(toolbar 0)))) ;hide the ESERVE toolbar window (t (mapcar '(lambda (tb-info) (eserve-restore-frame-
toolbar tb-info))

eserve-frame-previous-toolbar-alist)

(setq eserve-frame-previous-toolbar-alist nil)))

(setq eserve-current-toolbar nil))))
```

```
(defun eserve-eval-cmds (msgs)

"reads and evaluates commands from eserve message
stream"

(let ((current-cmd-str nil)

(current-cmd nil)

(cmd-front 0)

(index 0)

(cmds nil)

(cmds-len 0))

(cond (eserve-message-leftover (setq cmds (concat eserve-message-leftover msgs))

(setq eserve-message-leftover nil))

(t (setq cmds (concat msgs))))

(setq eserve-message-buffer nil)

(setq cmds-len (length cmds))

(while (< index cmds-len)

;; find a command (setq cmd-front index)

(while (and (< index cmds-len)

(not (char-equal (aref cmds index)
?\n)))

(setq index (+ index 1)))

;; check for message been split across buffers
```

```
            (cond
             ((and
                (>= index cmds-len)
                (not (char-equal (aref cmds (- index 1))
?\n)))
                (setq eserve-message-leftover (substring cmds
cmd-front index)))
               (t
                (setq current-cmd-str (substring cmds cmd-front
index))
                (setq current-cmd (read-from-string current-
cmd-str))
                (eval (car current-cmd))
                ;; go past newline
                (setq index (+ index 1))))))
      )

(defun eserve-set-app-name (app-name)
        "Set the name of the app connected to eserve"
        (setq eserve-app-name app-name))

(defun eserve-connect (eserve-portnum)
        "Connects to the ESERVE process"
        (condition-case err-msg
            (progn
              (cond
               ((not eserve-app-name)
```

```
                (setq eserve-app-name "eserve")))

(setq eserve-connection (open-network-stream
"eserve connection"

nil

"localhost"

eserve-
portnum))

(set-process-filter eserve-connection 'eserve-
connection-filter)

(set-process-sentinel eserve-connection
'eserve-connection-sentinel)

(eserve-event-connected)

(add-hook 'kill-buffer-hook 'eserve-kill-
buffer-hook)

(add-hook 'find-file-hooks 'eserve-find-file-hook)

(add-hook 'after-save-hook 'eserve-after-save-
hook)

(add-hook 'first-change-hook 'eserve-first-
change-hook)

(cond (eserve-bind-fkeys (eserve-init-fkey-functions))))

(error (message "%s: Could not connect to %s:
Please fix and retry."

err-msg eserve-app-name))))

(defun eserve-load-startup-file ()

"loads the file containing code to start the
connection between eserve/emacs"
```

- 54 -

```
        (cond
         ((and eserve-startup-file
             (stringp eserve-startup-file)
             (> (length eserve-startup-file) 0))
          (cond
           ((file-exists-p eserve-startup-file)
            (load eserve-startup-file)
            (delete-file eserve-startup-file)))
          (setq eserve-startup-file nil))))

(defun eserve-process-send-string (process str)
        "send STR to the eserve process over the connection
to eserve"
        (cond
         (process
            (process-send-string process str))))

(defun eserve-send-verb (verb &optional needsFilePos)
        "send a tool verb to ESERVE"
        (cond
         (eserve-connection
            (let ((file-name (buffer-file-name (current-
buffer)))
                  (current-line (eserve-cursor-line))
                  (current-col (eserve-cursor-column))
                  (selection (eserve-current-selection))
```

```
            (message-str nil))
        (if (not selection)
         (setq selection ""))
        (if (not file-name)
         (setq file-name "NULL"))
        (setq message-str
            (format "toolVerb %s %s %d,%d -1,-1 -1,-1 %d
%s\n"
                verb file-name
                (+ current-line 1)
                (+ current-col 1)
                (length selection) selection))
        (eserve-log-text (format "(%s)\n" message-str))
        (eserve-process-send-string eserve-connection
message-str)))))

(defun eserve-send-ack (ack-num)
      "send an ack to ESERVE"
      (let ((ack (format "ack %d\n" ack-num)))
        (eserve-log-text (format "(%s)\n" ack))
        (eserve-process-send-string eserve-connection
ack)))

;;
    ;; functions to invoke eserve from emacs
    ;;
```

```
(defvar eserve-launch-process nil)

(defvar eserve-launch-timer-max 180)

(defvar eserve-launch-timer-increment 5)

(defvar eserve-launch-timer-process nil)

(defvar eserve-launch-current-time 0)

(defvar eserve-launch-abort nil)

(defun eserve-app-start (app-name)
   "invokes an application from emacs"
   (cond
     ((not (stringp app-name))
       (message "No application name specified")
       nil)
     ((or eserve-connection eserve-launch-process)
       (message "Already connected, please exit application")
       nil)
     (t
       (setq eserve-app-name app-name)
       (eserve-init)
       (eserve-launch-app)
       t)))

(defun eserve-launch-timer-sentinel (proc str)
   (let ((stat (process-status proc)))
     (cond
```

- 57 -

```
        ((memq stat '(exit signal))

(setq eserve-launch-timer-process nil)

(eserve-launch-timer-timeout)))))

(defun eserve-launch-timer-reset ()

(setq eserve-launch-current-time 0)

(cond (eserve-launch-timer-process (setq eserve-launch-abort t)

(eserve-kill-launch-timer))))

(defun eserve-kill-launch-timer ()

(cond ((and eserve-launch-timer-process (eq (process-status eserve-launch-timer-
process) 'run))

(delete-process eserve-launch-timer-process)))

(setq eserve-launch-timer-process nil))

(defun eserve-setup-launch-timer ()

(setq eserve-launch-timer-process (start-process "launch timer process" nil "sleep"

(int-to-string eserve-launch-timer-
increment)))

(set-process-sentinel eserve-launch-timer-process
'eserve-launch-timer-sentinel))

(defun eserve-launch-timer-timeout ()
```

- 58 -

```
        (let ((startup-file-exists (file-readable-p eserve-
startup-file)))

(setq eserve-launch-current-time (+ eserve-launch-current-time eserve-launch-
timer-increment))

(cond (eserve-launch-abort (message "Connection aborted.")

(setq eserve-launch-abort nil))

(startup-file-exists (eserve-load-startup-file)

(eserve-launch-timer-reset)

(message (format "Connection to %s established"
eserve-app-name)))

((>= eserve-launch-current-time eserve-launch-
timer-max)

(eserve-launch-timer-reset)

(message (format "Error: Could not connect to %s"
eserve-app-name)))

(t (message (format "Waiting for %s to connect..."
eserve-app-name))

(eserve-setup-launch-timer)))))

(defun eserve-launch-app ()

(setq eserve-startup-file (make-temp-name
"/tmp/emacs"))

(setenv "SPRO_EDITOR_RENDEZVOUS_FILE" eserve-startup-
file)
```

```
        (condition-case err-msg (progn (setq eserve-launch-process (start-process "eserve
launch" nil eserve-app-name))

(message (format "Waiting for %s to connect..."
eserve-app-name)))

(file-error (message (format "Could not find %s, please check your PATH
variable"

eserve-app-name))))

(setenv "SPRO_EDITOR_RENDEZVOUS_FILE" nil)

(cond (eserve-launch-process (eserve-setup-launch-timer)

(set-process-sentinel eserve-launch-process
'eserve-launch-process-sentinel))))

(defun eserve-launch-process-cleanup ()
        "Cleans up after ESERVE process has terminated"
        (setq eserve-launch-process nil))

(defun eserve-launch-process-sentinel (process status)
        "Handles changes in status to ESERVE process."
        (cond
            ((memq (process-status process) '(signal exit
closed))
```

```
;;      (message (format "%s has terminated" eserve-app-
name))

(eserve-launch-process-cleanup))))

;;

;; eserve protocol functions for file and marker
management

;;

(defun eserve-quit-emacs ()
  "brings down emacs on behalf of eserve"
  (kill-emacs))

(defun eserve-load-file (file-to-load)
  "loads a file into a buffer on behalf of eserve"
  (let ((file-buffer (eserve-file-to-buffer file-to-load)))
    (cond
      ((not file-buffer)
       (cond
        ((file-exists-p file-to-load)
         (setq file-buffer (find-file file-to-load)))
        (t
         (setq file-buffer (switch-to-buffer
                            (create-file-buffer file-to-load)))))))
    (message "")
```

```
        (eserve-show-buffer file-buffer)))

(defun eserve-save-file (file-to-save)

"saves a file on behalf of eserve"

(let ((file-buffer (eserve-file-to-buffer file-to-save)))

(cond (file-buffer (save-excursion (set-buffer file-buffer)

(save-buffer))

(message "")))))

(defun eserve-front-file (file-to-front)

"switches a buffer, and raises its window to the front on behalf of eserve"

(let ((file-buffer (eserve-file-to-buffer file-to-front)))

(cond (file-buffer (switch-to-buffer file-buffer)

(eserve-raise-buffer file-buffer)))))

(defun eserve-show-file (file-to-show)

"switches a buffer to the front on behalf of eserve"

(let ((file-buffer (eserve-file-to-buffer file-to-show)))
```

```
         (eserve-show-buffer file-buffer)))

(defun eserve-set-mark (file-name line-num mark-id
mark-type)

"creates a mark in file-name at line line-num of type
mark-type"

(let ((file-buffer (eserve-file-to-buffer-create
file-name)))

(if file-buffer (let ((eserve-mark (eserve-make-eserve-mark
file-buffer line-num mark-id mark-type)))

(eserve-add-mark eserve-mark)

(if (/= mark-type 0)

(eserve-mark-change-mark-type eserve-mark
mark-type))))))

(defun eserve-delete-mark (file-name mark-id)

"deletes a MARKID from FILENAME"

(let ((file-buffer (eserve-file-to-buffer-create
file-name)))

(if file-buffer (eserve-remove-mark file-buffer mark-id))))

(defun eserve-goto-mark (file-name mark-id msg)

"warps to the mark associated with MARKID in FILENAME
showing MSG"

(let ((file-buffer (eserve-file-to-buffer file-
name)))

(if file-buffer
```

```
                (let ((eserve-mark (eserve-get-mark file-buffer
mark-id))
                      (emark nil))
                  (setq emark (eserve-mark-mark eserve-mark))
                  (goto-char (marker-position emark))
              (switch-to-buffer file-buffer)
              (cond
               ((> (length msg) 0)
                (message "")
                (princ msg t)))))))

(defun eserve-goto-line (file-name line-num)
      "warps to LINENUM in FILENAME"
      (let ((file-buffer (eserve-file-to-buffer file-
name)))
        (if file-buffer
            (let ((pos (eserve-line-to-pos file-buffer
line-num)))
              (goto-char pos)
              (switch-to-buffer file-buffer)))))

(defun eserve-get-mark-type (pos mark-type-list)
      ;; Return the mark-type in position POS in MARK-TYPE-
LIST.
      (aref mark-type-list pos))

(defun eserve-change-mark-type (file-name mark-id new-
type)
```

```
        ;; Change in FILE NAME the type of mark MARK ID to
NEW TYPE.

(let ((eserve-mark (eserve-get-mark (eserve-file-to-
buffer file-name) mark-id)))

(eserve-mark-change-mark-type eserve-mark new-
type)))

(defun eserve-set-mark-type-list (mark-type-list)

;; Set eserve-mark-type-list to MARK TYPE LIST and
perform any needed

;; initializations.  Return TBD if successful or
signal an error.

(cond

;; Sanity checks ...

((not (vectorp mark-type-list)) (signal 'wrong-type-
argument '()))

;; ... passed.

(t (setq eserve-mark-type-list mark-type-list)

(eserve-init-mark-types mark-type-list))))

;;;

;;; protocol support functions

;;;

(defun eserve-add-mark (eserve-mark)
```

```
        ;; Add a mark to the list of marks for the
corresponding buffer.

(let ((buff (eserve-mark-buffer eserve-mark))

(mark-list nil)

(mark-id (eserve-mark-id eserve-mark)))

(setq mark-list (eserve-get-buffer-marks buff))

(cond ((not mark-list)

(setq mark-list (eserve-create-buffer-marks
buff))))

(cond ((>= mark-id (length mark-list))

(setq mark-list (eserve-grow-vector mark-list
mark-id eserve-mark-vector-chunk))

(eserve-set-buffer-marks buff mark-list)))

;; check for old mark not deleted (let ((old-mark (aref mark-list mark-id)))

(cond (old-mark (eserve-mark-clear-renderer old-mark))))

(aset mark-list mark-id eserve-mark)))

(defun eserve-remove-mark (file-buffer mark-id)

"removes mark corresponding to MARKID from
FILEBUFFER's list of marks"

(let ((mark-list (eserve-get-buffer-marks file-
buffer)))

(cond
```

```
        (mark-list (let ((eserve-mark (aref mark-list mark-id)))

(cond (eserve-mark (eserve-mark-clear-renderer eserve-mark)

(aset mark-list mark-id nil))))))))

(defun eserve-get-mark (file-buffer mark-id)

"returns the eservemark associated with MARKID and BUFFER"

(let ((mark-list (eserve-get-buffer-marks file-buffer))

(list-size 0))

(setq list-size (length mark-list))

(cond ((< mark-id list-size)

(aref mark-list mark-id))

(t nil))))

(defun eserve-get-buffer-marks (file-buffer)

"returns the marks associated with BUFFER"

(cl-gethash file-buffer eserve-buffers-marks-list))

(defun eserve-set-buffer-marks (file-buffer mark-list)

"associates MARKLIST with BUFFER"

(cl-puthash file-buffer mark-list eserve-buffers-marks-list))
```

```
(defun eserve-delete-buffer-marks (file-buffer)

"dis-associates MARKLIST with BUFFER, deletes buffer
from list"

(cl-remhash file-buffer eserve-buffers-marks-list))

(defun eserve-create-buffer-marks (file-buffer)

"creates a marks list and associates it with BUFFER,
RETURNS mark list"

(let ((mark-list (make-vector eserve-mark-vector-
chunk nil)))

(eserve-set-buffer-marks file-buffer mark-list)

mark-list))

(defun eserve-grow-vector (vector-to-grow max-index
chunk-size)

"extend LIST TO GROW to contain MAX INDEX, RETURN new
VECTOR"

(let ((new-size (* chunk-size (+ (/ max-index chunk-size) 1)))

(size-diff 0)

(new-vector nil))

(setq size-diff (- new-size (length vector-to-
grow)))

(setq new-vector (vconcat vector-to-grow (make-
vector size-diff nil)))))

(defun eserve-mark-change-mark-type (eserve-mark mark-
type-index)
```

- 68 -

```
;; Change ESERVE MARK to NEW MARK TYPE (save-excursion (set-buffer (eserve-mark-buffer eserve-mark))

(goto-char (marker-position (eserve-mark-mark
eserve-mark)))

(let ((new-mark-type (eserve-get-mark-type mark-
type-index eserve-mark-type-list))

(beg-point (progn (beginning-of-line)
(point)))

(end-point (progn (end-of-line) (point))))

;; clear out old visual if it exists (eserve-mark-clear-renderer eserve-mark)

(if (eserve-mark-type-face new-mark-type)

(eserve-set-mark-renderer eserve-mark (eserve-create-overlay-or-extent new-mark-type beg-point end-point)))))))

(defun eserve-mark-clear-renderer (eserve-mark)

;; remove visual remains of ESERVE MARK (if eserve-mark (let ((old-renderer (eserve-mark-renderer eserve-
mark)))

(if old-renderer (save-excursion (set-buffer (eserve-mark-buffer eserve-
mark))
```

```
              (eserve-delete-overlay-or-extent old-
renderer)
              (eserve-set-mark-renderer eserve-mark
nil))))))

(defun eserve-clear-buffer-marks (buff marks-list)

"clears visuals for all ESERVE marks in the given
buffer"

(cond ((and buff marks-list)

(mapcar 'eserve-mark-clear-renderer marks-list))))

(defun eserve-clear-all-marks ()

"removes visuals backing all ESERVE marks in all
buffers"

(cond (eserve-buffers-marks-list (maphash 'eserve-clear-buffer-marks eserve-buffers-
marks-list))))

;;

;; editor state message functions

;;

(defun eserve-get-cursor-row-text ()

"Send the text of the line the cursor is on to
ESERVE"

(save-excursion
```

```
        (let ((beg (progn (beginning-of-line) (point)))
              (end (progn (end-of-line) (point)))
              (message-string nil)
              (row-text-str nil))
          (setq row-text-str (buffer-substring beg end))
          (setq message-string (format "cursorRowText %d %s\n"
                                       (length row-text-str)
                                       row-text-str))
          (eserve-process-send-string eserve-connection message-string))))

(defun eserve-get-cursor-row ()
      "Send the row number of the line the cursor is on to ESERVE"
      (save-excursion
        (let ((row-num (eserve-cursor-line))
              (message-string nil))
          (setq message-string (format "cursorRow %d\n" row-num))
          (eserve-process-send-string eserve-connection message-string))))

(defun eserve-get-cursor-col ()
      "Send the column number of the cursor on the line the cursor is on to ESERVE"
      (save-excursion
        (let ((col-num (current-column))
```

```
        (message-string nil))

(setq message-string (format "cursorCol %d\n" col-
num))

(eserve-process-send-string eserve-connection
message-string))))

(defun eserve-get-selected-text ()
    "Send the text of the current selection on to ESERVE"
    (save-excursion
      (let ((sel-text (eserve-get-selection))
            (sel-text-length 0)
            (message-string nil))
        (if (not sel-text)
          (setq sel-text ""))
        (setq sel-text-length (length sel-text))
        (setq message-string (format "selectedText %d %s\n"
                        sel-text-length sel-text)))
        (eserve-process-send-string eserve-connection
message-string)))

;;
  ;; eserve-mark object functions
  ;;

;;
  ;; an eservemark object has the form:
  ;;    [eservemark MARK-ID MARK-TYPE MARK RENDER]
```

```
        ;;

;;   'eservemark   : symbol, identifies this vector as
an eserve-mark

;;   mark-id    : integer, used by ESERVE

;;   mark-type  : integer, index into the vector eserve-
mark-type-list

;;   mark       : mark, the mark itself

;;   renderer   : overlay or extent (defun eserve-markp (x)

"returns t if x is an eservemark"

(and (vectorp x) (= (length x) 5) (eq (aref x 0)
'eservemark)))

(defun eserve-mark-id (eservemark)

"returns the id of an eservemark"

(aref eservemark 1))

(defun eserve-mark-type (eservemark)

"returns the type of an eservemark"

(aref eservemark 2))

(defun eserve-mark-mark (eservemark)

"returns the emacs mark for an eservemark"

(aref eservemark 3))

(defun eserve-mark-renderer (eservemark)
```

```
   "returns the overlay or extent of an eservemark"
   (aref eservemark 4))

(defun eserve-mark-buffer (eservemark)
   "returns the buffer of an eservemark"
   (marker-buffer (eserve-mark-mark eservemark)))

(defun eserve-set-mark-id (eservemark new-id)
   "sets the id of an eservemark"
   (aset eservemark 1 new-id))

(defun eserve-set-mark-type (eservemark new-type)
   "sets the type of an eservemark"
   (aset eservemark 2 new-type))

(defun eserve-set-mark-mark (eservemark new-mark)
   "sets the emacs mark for an eservemark"
   (aset eservemark 3 new-mark))

(defun eserve-set-mark-renderer (eservemark new-renderer)
      "sets the emacs overlay or extent for an eservemark"
      (aset eservemark 4 new-renderer))
```

```
        (defun eserve-make-eserve-mark (file-buffer line-num
mark-id mark-type)

"creates an eservemark object at line line-num in
buffer file-buffer"

(let ((eservemark (make-vector 5 nil))

(emark (make-marker))

(buffpos (eserve-line-to-pos file-buffer line-
num)))

(aset eservemark 0 'eservemark)

(eserve-set-mark-id eservemark mark-id)

(eserve-set-mark-type eservemark mark-type)

(eserve-set-mark-mark eservemark emark)

(set-marker emark buffpos file-buffer)

(eserve-set-mark-renderer eservemark nil)

eservemark))

;;
    ;; eserve-mark-type object functions
    ;;

;;
    ;; an eserve-mark-type object has the form
    ;;     [fgColor bgColor glyphfile glyph face]
    ;;
    ;;    fgColor   : string   the foreground color of the
mark
    ;;    bgColor   : string   the background color of the
mark
```

```
        ;;    glyphFile : string   the pathname of the XPM/XBM
glyph of this mark ;;    glyph     : gylph    the gylph itself ;;    face      : face     the face of the highlighted
line

;;

(defsubst eserve-mark-type-fgColor (eserve-mark)

;; return the foreground color of MARK-TYPE (aref eserve-mark 0))

(defsubst eserve-mark-type-bgColor (eserve-mark)

;; return the background color of MARK-TYPE (aref eserve-mark 1))

(defsubst eserve-mark-type-glyphFile (eserve-mark)

;; return the glyph file name of MARK-TYPE (aref eserve-mark 2))

(defsubst eserve-mark-type-glyph (eserve-mark)

;; return the glyph itself of MARK-TYPE (aref eserve-mark 3))

(defsubst eserve-mark-type-face (eserve-mark)

;; return the face of MARK-TYPE (aref eserve-mark 4))
```

- 76 -

```
(defun eserve-init-mark-types (mark-type-list)

;; For XEmacs only, for each element of the mark-type
list, initialize the

;; glyph.

(cond ((vectorp mark-type-list)

(mapcar 'eserve-init-mark-type mark-type-list))

(t t)))

(defun eserve-init-mark-type (mark-type)

;; Make a pixmap out of the glyphFile specified and
store it in the glyph

;; object.  Create a new face and set its foreground
and background

;; colors.  Then append the mark-type to the eserve-
mark-type-list.

;; TBD: file checks for glyphFile

;; TBD: protect against errors in making the pixmap
(incorrect format, etc.)

(when (and (eserve-mark-type-glyphFile mark-type)
               running-xemacs)

(aset mark-type 3 (make-pixmap (eserve-mark-type-
glyphFile mark-type)))

(set-pixmap-contributes-to-line-height (aref mark-
type 3) nil))

;; if there is not an existing face and either a
foreground or background
```

```
        ;; color, then create a face and set its foreground
and background colors (when (and (not (eserve-mark-type-face mark-type))
                   (or (eserve-mark-type-fgColor mark-type)
                       (eserve-mark-type-bgColor mark-type)))
          (let
              ((fgColor (eserve-mark-type-fgColor mark-type))
               (bgColor (eserve-mark-type-bgColor mark-type))
               (face (aset mark-type 4 (copy-face 'eserve-
highlight (gensym)))))
            (when fgColor(set-face-foreground face fgColor))
            (when bgColor(set-face-background face
bgColor)))))

;;
    ;; eserve-menu object functions
    ;;

;;
    ;; an eservemenu object has the form:
    ;;    [eservemenu LABEL NUMITEMS ITEMS HANDLE]
    ;;
    ;; 'eservemenu   : symbol, identifies this vector as
an eserve-menu
    ;;    label     : string, displayed in menu bar
    ;;    numitems  : integer, number of menu items in items
array
    ;;    items     : array of menu items
```

```
;;    handle    : editor specific handle to menu (defun eserve-menup (x)
    "returns t if x is an eservemenu"
    (and (vectorp x) (= (length x) 5) (eq (aref x 0)
'eservemenu)))

(defun eserve-menu-label (eservemenu)
    "returns the label of an eservemenu"
    (aref eservemenu 1))

(defun eserve-menu-numitems (eservemenu)
    "returns the number of menu items for an eservemenu"
    (aref eservemenu 2))

(defun eserve-menu-items (eservemenu)
    "returns the array of menu items for an eservemenu"
    (aref eservemenu 3))

(defun eserve-menu-handle (eservemenu)
    "returns the editor specific handle for an
eservemenu"
    (aref eservemenu 4))

(defun eserve-set-menu-label (eservemenu newlabel)
    "sets the label of an eservemenu"
```

```
        (aset eservemenu 1 newlabel))

(defun eserve-set-menu-numitems (eservemenu newnum)

"sets the number of menu items for an eservemenu"

(aset eservemenu 2 newnum))

(defun eserve-set-menu-items (eservemenu newitems)

"sets the menu items for an eservemenu"

(aset eservemenu 3 newitems))

(defun eserve-set-menu-handle (eservemenu newhandle)

"sets the editor specific handle for an eservemenu"

(aset eservemenu 4 newhandle))

;;

;; eserve-button object functions

;;

;;

;; an eservebutton object has the form:

;;      [eservebutton LABEL VERB NEEDFILEPOS HELP SENSE ACCELERATOR]

;;

;;   'eservebutton : symbol, identifies this vector as an eserve-button

;;   label         : string, displayed in button
```

```
      ;;   verb        : string, verb (action) sent when
button is selected

;;   needfilepos : bool, if t then send file position
info with verb

;;   help        : string, documents button for user

;;   accelerator : string, key binding to invoke button

;;   sense       : bool, if t, button is enabled

;;   sensesym    : symbol, used to store sense value

;;   iconfile    : string, file containing icon
definition

;;   offset      : integer, offset in pixels from
previous button (defun eserve-buttonp (x)

"returns t if x is an eservebutton"

(and (vectorp x) (= (length x) 10) (eq (aref x 0)
'eservebutton)))

(defun eserve-button-label (eservebutton)

"returns the label of an eservebutton"

(aref eservebutton 1))

(defun eserve-button-verb (eservebutton)

"returns the verb of an eservebutton"

(aref eservebutton 2))

(defun eserve-button-needfilepos (eservebutton)

"returns the needfilepos member of an eservebutton"
```

```
  (aref eservebutton 3))

(defun eserve-button-help (eservebutton)

"returns the help member of an eservebutton"

(aref eservebutton 4))

(defun eserve-button-accelerator (eservebutton)

"returns the accelerator member of an eservebutton"

(aref eservebutton 5))

(defun eserve-button-sense (eservebutton)

"returns the sense member of an eservebutton"

(aref eservebutton 6))

(defun eserve-button-sensesym (eservebutton)

"returns the sensesym member of an eservebutton"

(aref eservebutton 7))

(defun eserve-button-iconfile (eservebutton)

"returns the iconfile member of an eservebutton"

(aref eservebutton 8))

(defun eserve-button-offset (eservebutton)

"returns the offset member of an eservebutton"

(aref eservebutton 9))
```

```
(defun eserve-set-button-label (eservebutton newlabel)
   "sets the label of an eservebutton"
   (aset eservebutton 1 newlabel))

(defun eserve-set-button-verb (eservebutton newverb)
   "sets the verb member for an eservebutton"
   (aset eservebutton 2 newverb))

(defun eserve-set-button-needfilepos (eservebutton
newneedfilepos)
     "sets the needfilepos member an eservebutton"
     (aset eservebutton 3 newneedfilepos))

(defun eserve-set-button-help (eservebutton newhelp)
   "sets the help member an eservebutton"
   (aset eservebutton 4 newhelp))

(defun eserve-set-button-accelerator (eservebutton
newaccelerator)
     "sets the accelerator member an eservebutton"
     (aset eservebutton 5 newaccelerator))

(defun eserve-set-button-sense (eservebutton newsense)
   "sets the sense member an eservebutton"
   (aset eservebutton 6 newsense))
```

```
(defun eserve-set-button-sensesym (eservebutton
newsensesym)
    "sets the sensesym member an eservebutton"
    (aset eservebutton 7 newsensesym))

(defun eserve-set-button-iconfile (eservebutton
newiconfile)
    "sets the iconfile member an eservebutton"
    (aset eservebutton 7 newiconfile))

(defun eserve-set-button-offset (eservebutton
newoffset)
    "sets the offset member an eservebutton"
    (aset eservebutton 7 newoffset))

;;
;; button support functions
;;

(defun eserve-button-create-cmd (eservebutton name-
prefix)
    "creates a command function to be invoked when the
eservebutton is selected"
    (cond
      ((and name-prefix eservebutton)
        (let ((func-name (intern (concat name-prefix
```

```
                                  (eserve-button-label
eservebutton)))))

(eval (` (defun (, func-name) ()

(interactive)

(eserve-send-verb (, (eserve-button-verb
eservebutton))

(, (eserve-button-needfilepos
eservebutton)))))))))

(defun eserve-button-create-sensesym (eservebutton
name-prefix)

"creates the symbol which when evaluated determines
button sense"

(cond ((and name-prefix eservebutton)

(intern (concat name-prefix "-"

(eserve-button-label eservebutton) "-
sense")))))

(defun eserve-register-button (button)

"adds BUTTON to the verb button hash table"

(let ((verb (eserve-button-verb button))

(button-list nil))

(cond (verb (setq button-list (cl-gethash verb eserve-verb-
button-hash))

(cl-puthash verb (cons button button-list)
eserve-verb-button-hash)))))
```

```
        (defun eserve-set-sensitivity (verb-sense)

"sets the sensitivity of the buttons corresponding
VERB-SENSE pair"

(let ((verb (aref verb-sense 0))

(sense (aref verb-sense 1))

(sense-sym nil)

(button-list nil))

(setq button-list (cl-gethash verb eserve-verb-
button-hash))

(while button-list (set (eserve-button-sensesym (car button-list))
sense)

(setq button-list (cdr button-list)))))

(defun eserve-set-sensitivities (verb-sense-array)

"applies the sense values in VERB-SENSE-ARRAY to the
existing eserve buttons"

(mapcar 'eserve-set-sensitivity verb-sense-array)

(cond ((and running-xemacs (not eserve-use-bb-toolbar)) ;;
19.11

(eserve-update-frame-toolbars)

)))

;;

;; menu support functions

;;
```

```
(defun eserve-emacs-add-menus (menus)
  "adds menus from the MENUS list to the menu bar"
  (mapcar 'eserve-emacs-menu-add (reverse menus))
  (setq eserve-menus menus)
  (redraw-display))

(defun eserve-emacs-delete-menus (menus)
  "deletes menus from the MENUS list from the menu bar"
  (cond
    (menus
      (mapcar 'eserve-emacs-menu-delete menus)
      (setq eserve-menus nil)
      (redraw-display))))

(defun eserve-xemacs-add-menus (menus)
  "adds menus from the MENUS list to the menu bar"
  (mapcar 'eserve-xemacs-menu-add menus)
  (setq eserve-menus menus))

(defun eserve-xemacs-delete-menus (menus)
  "deletes menus from the MENUS list from the menu bar"
  (cond
    (menus
      (mapcar 'eserve-xemacs-menu-delete menus)
```

```
        (setq eserve-menus nil))))

(defun eserve-xemacs-menu-add (eservemenu)
      "adds a ESERVEMENU to the xemacs menu bar"
      (cond
        ((and eservemenu (eserve-menup eservemenu))
          (let ((handle (` ( (, (eserve-menu-label eservemenu) ))))
                (buttons nil)
                (menulist nil)
                (index 0)
                (max-items (eserve-menu-numitems eservemenu)))
            (eserve-set-menu-handle eservemenu handle)
            (setq buttons (eserve-menu-items eservemenu))
            (while (< index max-items)
              (setq menulist (append menulist
                               (list (eserve-xemacs-menuitem-create
                                       eservemenu (aref buttons index)))))
              (setq index (+ index 1)))
            (add-menu nil (eserve-menu-label eservemenu) menulist)))))

(defun eserve-xemacs-menuitem-create (eservemenu eservebutton)
      "returns an xemacs menuitem from ESERVEBUTTON"
      (let ((menuitem (make-vector 4 nil)))
```

```
        (aset menuitem 0 (eserve-button-label
eservebutton))

(aset menuitem 1 (eserve-button-create-cmd
eservebutton (eserve-menu-label eservemenu)))

(eserve-set-button-sensesym eservebutton (eserve-button-create-sensesym eservebutton
(eserve-menu-label eservemenu)))

(set (eserve-button-sensesym eservebutton)

(eserve-button-sense eservebutton))

(aset menuitem 2 (eserve-button-sensesym
eservebutton))

(eserve-register-button eservebutton)

menuitem))

(defun eserve-xemacs-menu-delete (eservemenu)

"delete a ESERVEMENU from the xemacs menu bar"

(cond ((and eservemenu (eserve-menup eservemenu))

(delete-menu-item (eserve-menu-handle
eservemenu)))))

(defun eserve-emacs-menu-add (eservemenu)

"adds a ESERVEMENU to the menu bar"

(cond ((and eservemenu (eserve-menup eservemenu))

(let ((handle (` [menu-bar (, (intern (eserve-menu-
label eservemenu))) ]))
```

- 89 -

```
        (kmap (make-sparse-keymap (eserve-menu-label
eservemenu)))

(index (eserve-menu-numitems eservemenu))

(button-cmd nil)

(button nil))

(define-key global-map handle (cons (eserve-menu-
label eservemenu) kmap))

(eserve-set-menu-handle eservemenu handle)

(while (> index 0)

(setq button (aref (eserve-menu-items eservemenu)
(- index 1)))

(setq button-cmd (eserve-button-create-cmd button
(eserve-menu-label eservemenu)))

(define-key kmap (` [ (, (intern (eserve-button-
label button))) ])

(` ( (, (eserve-button-label button))

(, (eserve-button-help button)) .

(, button-cmd))))

(eserve-set-button-sensesym button (eserve-button-create-sensesym button (eserve-
menu-label eservemenu)))

(set (eserve-button-sensesym button) (eserve-
button-sense button))

(put button-cmd 'menu-enable (eserve-button-
sensesym button))

(eserve-register-button button)

(setq index (- index 1)))

(setq menu-bar-final-items (append
```

```
                            (list (intern (eserve-menu-label
eservemenu)))
                          menu-bar-final-items))))))

(defun eserve-emacs-menu-delete (eservemenu)
      "delete a ESERVEMENU from the emacs menu bar"
      (cond
        ((and eservemenu (eserve-menup eservemenu))
          (global-unset-key (eserve-menu-handle eservemenu))
          (setq menu-bar-final-items
              (delete (intern (eserve-menu-label eservemenu))
                  menu-bar-final-items)))))

;;
    ;; version control support
    ;;
    (defun eserve-emacs-vc-setup ()
      "sets up the VC menu for GNU emacs"
      (require 'vc)
      (cond
          ((not (or (keymapp (lookup-key global-map [menu-bar
vc]))
                (keymapp (lookup-key global-map [menu-bar
VC]))))
          (setq eserve-vc-teardown-menu t)
          (defvar eserve-vc-menu (make-sparse-keymap "eserve-
vc"))
```

```
        (define-key global-map [menu-bar vc] (cons "VC"
eserve-vc-menu))

(define-key eserve-vc-menu [eserve-vc-list-reg-
files]
          (cons "List Registered Files" 'eserve-vc-
directory4))
        (define-key eserve-vc-menu [eserve-vc-list-any-
locked-files]
          (cons "List Locked Files Any User" 'vc-
directory))
        (define-key eserve-vc-menu [eserve-vc-list-locked-
files]
          (cons "List Locked Files" 'eserve-vc-
directory16))
        (define-key eserve-vc-menu [eserve-vc-print-log]
          (cons "Show Edit History" 'vc-print-log))
        (define-key eserve-vc-menu [separator2]
          '("----" . nil))
        (define-key eserve-vc-menu [eserve-vc-revert-
buffer]
          (cons "Revert File" 'vc-revert-buffer))
        (setq eserve-vc-next-op-item (define-key eserve-vc-
menu [eserve-vc-next-action]
                    (cons "NEXT-OPERATION" 'vc-next-
action)))

(put 'vc-revert-buffer 'menu-enable 'vc-mode)
        (put 'vc-diff 'menu-enable 'vc-mode)
        (put 'vc-print-log 'menu-enable 'vc-mode)
```

```
        (put 'vc-next-action 'menu-enable '(eserve-vc-menu-
sensitize))

(setq menu-bar-final-items (append '(vc) menu-bar-
final-items)))))

(defun eserve-emacs-vc-cleanup ()
      "tears down the VC menu for GNU emacs"
      (cond
        (eserve-vc-teardown-menu (global-unset-key [menu-bar vc])

(setq eserve-vc-teardown-menu nil))))

(defun eserve-vc-directory16 ()
      (interactive)
      (vc-directory '(16)))

(defun eserve-vc-directory4 ()
      (interactive)
      (vc-directory '(4)))

(defun eserve-vc-menu-sensitize ()
      (let ((file (if buffer-file-name
            (file-name-nondirectory buffer-file-name)
            (buffer-name)))
          (owner nil))
```

```
            (setcar eserve-vc-next-op-item
                (cond ((not vc-mode)
                    "Register File")
                    ((not (setq owner (vc-locking-user file)))
                    "Check out File")
                    ((not (string-equal owner (user-login-
name)))
                    "Steal File Lock")
                    (t "Check in File")))))

(defun eserve-xemacs-vc-setup ()
            "sets up the VC menu for XEmacs"
            (require 'vc)
            (cond
             ((and (not (assoc "VC" current-menubar))
                    (boundp 'vc-default-menu))
                (setq eserve-vc-teardown-menu t)
                (add-menu () "VC" vc-default-menu))))

(defun eserve-xemacs-vc-cleanup ()
            "tears down the VC menu for XEmacs"
            (cond
             (eserve-vc-teardown-menu
                ;; for now do nothing
                (setq eserve-vc-teardown-menu nil))))
```

- 94 -

```
;;
;; file/buffer utility functions
;;

(defun eserve-file-to-buffer (file-name)
     "Returns the buffer containing the contents of FILENAME or nil\n\
     if no such buffer exists."
     (get-file-buffer (expand-file-name (abbreviate-file-name file-name))))

(defun eserve-file-to-buffer-create (file-name)
     "returns the buffer containing the contents of FILENAME (creates the buffer if not found)"
     (let ((full-file-name (abbreviate-file-name file-name))
           (file-buff nil))
        (setq file-buff (get-file-buffer full-file-name))
        (cond
         (file-buff file-buff)
         (t (find-file-noselect full-file-name)))))

(defun eserve-line-to-pos (file-buffer line-no)
    "returns the character position of LINENO in BUFFER"
    (save-excursion
       (set-buffer file-buffer)
       (goto-char 1)
```

```
        (goto-line line-no)

(point)))

(defun eserve-cursor-line ()

(save-excursion (progn (beginning-of-line) (count-lines 1
(point)))))

(defun eserve-cursor-column ()

(current-column))

(defun eserve-current-selection ()

"return the text of the current selection"

(save-excursion (let ((sel-text nil)

(sel-exists (x-selection-exists-p 'PRIMARY))

(own-text (x-selection-owner-p))

(message-string nil))

(cond ((and sel-exists own-text)

(setq sel-text (x-get-selection-internal 'PRIMARY
'STRING)))

(t nil)))))

(defun eserve-show-buffer (file-buffer)
```

```
    "switches current window to FILEBUFFER"

(cond (file-buffer (switch-to-buffer file-buffer))))

(defun eserve-raise-buffer (file-buffer)

"raises the X window containing FILEBUFFER"

(cond (file-buffer (raise-frame (window-frame (get-buffer-window file-
buffer))))))

(defun eserve-add-to-path (dir)

"adds DIR to the emacs LOAD-PATH"

(cond ((and dir (stringp dir)

(not (member dir load-path)))

(setq load-path (append (list (expand-file-name dir)) load-
path)))))

;;

;; hook functions for editor events

;;
```

```
(defun eserve-find-file-hook ()
    "notifies client that new file has been loaded into emacs"
    (let ((file-name (buffer-file-name nil))
          (file-buffer nil))
      (cond
        (file-name
          (setq file-buffer (eserve-file-to-buffer file-name))
          (cond
            (file-buffer
              (eserve-event-loaded-file file-name)))))))

(defun eserve-first-change-hook ()
    "notifies client that file has been modified by emacs"
    (let ((file-name (buffer-file-name nil)))
      (cond
        (file-name
          (eserve-event-modified-file file-name)))))

(defun eserve-after-save-hook ()
    "notifies client that new file has been saved by emacs"
    (let ((file-name (buffer-file-name nil)))
      (cond
        (file-name
```

```
              (eserve-event-saved-file file-name)))))

(defun eserve-kill-buffer-hook ()

"deletes buffer from eserve lists and informs eserve
of event"

(cond (buffer-file-name (let ((deleted-buffer (get-file-buffer buffer-file-
name)))

(eserve-log-text (format "eserve-kill-buffer hook
-buffer name %s\n" buffer-file-name))

(if (not deleted-buffer)

(eserve-log-text "eserve-kill-buffer hook -no
deleted buffer\n"))

(cond (deleted-buffer (eserve-event-deleted-file buffer-file-name)

(cond ((eserve-get-buffer-marks deleted-buffer)

(eserve-delete-buffer-marks deleted-
buffer)))))))

(t (eserve-log-text "eserve-kill-buffer hook - no
buffer name\n"))))

;;

;; event functions - used to inform eserve of events
occurring
```

```
;; in emacs

;;

(defun eserve-event-deleted-file (deleted-file-name)
    "informs eserve that DELETEDFILENAME has been
deleted"
    (let ((event-string (concat "deletedFile " deleted-file-name "\n")))
        (eserve-process-send-string eserve-connection event-string)
        (eserve-log-text (format "(%s)\n" event-string))))

(defun eserve-event-loaded-file (loaded-file-name )
    "informs eserve that LOADEDFILENAME has been loaded"
    (let ((event-string (concat "loadedFile " loaded-file-name " 0\n")))
        (eserve-process-send-string eserve-connection event-string)
        (eserve-log-text (format "(%s)\n" event-string))))

(defun eserve-event-modified-file (modified-file-name)
    "informs eserve that MODIFIEDFILENAME has been
modified"
    (let ((event-string (concat "modifiedFile " modified-file-name "\n")))
        (eserve-process-send-string eserve-connection event-string)
        (eserve-log-text (format "(%s)\n" event-string))))

(defun eserve-event-saved-file (saved-file-name)
```

```
        "informs eserve that SAVEDFILENAME has been loaded"

(let ((event-string (concat "savedFile " saved-file-
name "\n")))

(eserve-process-send-string eserve-connection
event-string)

(eserve-log-text (format "(%s)\n" event-string))))

(defun eserve-editor-version ()

"returns a string containing the major/minor version
number"

(let ((version-end (string-match " " emacs-version))

(editor-version emacs-version))

(cond (version-end (setq editor-version (substring emacs-version 0
                                 version-end))))

editor-version))

(defun eserve-event-connected ()

"informs eserve that it is connected to emacs"

(let ((event-string nil))

(cond (running-xemacs (setq event-string (format "connected xemacs %d
%s\n"
                                  eserve-protocol-version
                                  (eserve-editor-version))))
```

```
        (t
           (setq event-string (format "connected emacs %d
%s\n"
                                eserve-protocol-version
                                (eserve-editor-version)))))
        (eserve-process-send-string eserve-connection
event-string)
        (eserve-log-text (format "(%s)\n" event-string))))

;;
     ;; eserve function key binding registration/invocation
functions
     ;;

(defun eserve-add-fkey-function (funcname)
       "registers fkey-binding function named by the atom
FUNCNAME to be called at connect time"
       (cond
          ((and funcname (symbolp funcname)
             (fboundp funcname))
             (setq eserve-fkey-functions (append eserve-fkey-
functions
                              (list (symbol-function
funcname)))))))

(defun eserve-init-fkey-functions ()
       "calls all the registered function key binding
functions"
```

```
        (mapcar 'funcall eserve-fkey-functions))

;;;
   ;;; Toolbar (aka buttonbar) functions
   ;;;
        (defun eserve-set-bb-tb-table (toolbar-table)   ;;
19.11
        "Sets eserve-toolbar-table to TOOLBAR-TABLE, performs
all needed
        initializations and displays the toolbar.  [Returns
TBD if successful, or TBD
        if a non-fatal error is raised.  Signals the error
TBD otherwise.]"
    )

(defun eserve-toggle-frame-toolbar (frame)
          "toggles TOOLBAR for FRAME"
          (cond
           ((equal eserve-current-toolbar
                (specifier-instance top-toolbar frame))
            (eserve-deinstall-frame-toolbar frame))
           (t
            (eserve-install-frame-toolbar frame eserve-current-
toolbar))))

(defun eserve-install-frame-toolbar (frame toolbar)
        "saves current toolbar info for FRAME and puts up
TOOLBAR on FRAME"
```

```
        (eserve-save-frame-toolbar frame)

(eserve-set-frame-toolbar frame toolbar))

(defun eserve-deinstall-frame-toolbar (frame)

"takes down current toolbar on FRAME and puts up
previous toolbar"

(let ((toolbar-info (assoc frame eserve-frame-
previous-toolbar-alist)))

(cond (toolbar-info (eserve-restore-frame-toolbar toolbar-info)))))

(defun eserve-set-frame-toolbar (frame toolbar)

"put TOOLBAR up on FRAME"

;;   (add-spec-to-specifier top-toolbar-height frame
eserve-toolbar-icon-height)

(add-spec-to-specifier top-toolbar toolbar frame))

(defun eserve-save-frame-toolbar (frame)

"save current toolbar info for FRAME so we can
restore it later"

(let ((toolbar-info (assoc frame eserve-frame-
previous-toolbar-alist)))

(cond (toolbar-info (setcdr toolbar-info (list (specifier-instance
top-toolbar-height frame))))

(t
```

```
        (setq eserve-frame-previous-toolbar-alist
            (append
                (list (list frame (specifier-instance top-
toolbar-height (selected-frame))))
                eserve-frame-previous-toolbar-alist))))))

(defun eserve-restore-frame-toolbar (toolbar-info)
       "restore information from TOOLBAR-INFO"
       (let ((frame (nth 0 toolbar-info))
             (toolbar-height (nth 1 toolbar-info)))
         (cond
           ((frame-live-p frame)
            (remove-specifier top-toolbar frame)
;;          (add-spec-to-specifier top-toolbar-height
toolbar-height frame)
            ))
         (setq eserve-frame-previous-toolbar-alist
               (delq toolbar-info eserve-frame-previous-
toolbar-alist))))

(defun eserve-update-frame-toolbars ()
       "update all eserve frame toolbars"
       (mapcar '(lambda (tb-info)
                  (add-spec-to-specifier
                     top-toolbar eserve-current-toolbar (nth 0
tb-info)))
               eserve-frame-previous-toolbar-alist))
```

```
        (defun eserve-set-toolbar-table (toolbar-table)

"Sets eserve-toolbar-table to TOOLBAR-TABLE, performs
all needed initializations and displays the toolbar.  [Returns
TBD if successful, or TBD if a non-fatal error is raised.  Signals the error
TBD otherwise.]"

(cond (running-xemacs (let ((old-tb-bg-attr (assoc "BgColor" xpm-color-
symbols))

(new-tb-bg-color nil)

(new-tb-bg-attr nil))

(message "Initializing toolbar ...")

;; toolbar checks (when (not (vectorp toolbar-table))

(signal 'wrong-type-arg '(toolbar-table)))

;; temporary variable (setq eserve-use-bb-toolbar nil) ;; 19.11

;; substitute toolbar background for icon bg
color (setq new-tb-bg-color (cdr (assq 'background-
toolbar-color (frame-parameters (selected-
frame)))))

(cond
```

```
              ((not new-tb-bg-color)

(setq new-tb-bg-color (face-background
'default))))

(setq xpm-color-symbols (delete old-tb-bg-attr
xpm-color-symbols))

(setq xpm-color-symbols (append (list (` ("BgColor" (, new-tb-bg-color))))

xpm-color-symbols))

;; create and install toolbar (when (not eserve-current-toolbar)

(eserve-init-toolbar toolbar-table))

(eserve-install-frame-toolbar (selected-frame)
eserve-current-toolbar)

;; substitute previous/saved bg color for icon bg
color (setq new-tb-bg-attr (assoc "BgColor" xpm-color-
symbols))

(setq xpm-color-symbols (delq new-tb-bg-attr xpm-
color-symbols))

(setq xpm-color-symbols (append (list old-tb-bg-
attr)

xpm-color-symbols))

(message ""))))))

(defun eserve-init-toolbar (toolbar-table)

(setq eserve-toolbar-table toolbar-table)  ; Save
toolbar-table
```

- 107 -

```
        (setq eserve-current-toolbar nil)     ;delete any
previous toolbars (mapcar 'eserve-init-toolbar-item toolbar-table))

(defun eserve-init-toolbar-item (toolbar-item)

(let ((verb     (eserve-button-verb toolbar-item))

(filePos (eserve-button-needfilepos toolbar-item))

(button-cmd (eserve-button-create-cmd toolbar-item
"eserve-toolbar"))

(button-sense (eserve-button-sense toolbar-item))

(button-sensesym (eserve-button-create-sensesym
toolbar-item "eserve-toolbar"))

(button-space (eserve-button-offset toolbar-item))

(spacer nil))

(set button-sensesym button-sense)

(eserve-set-button-sensesym toolbar-item button-
sensesym)

(eserve-register-button toolbar-item)

(cond ((and (integerp button-space) (> button-space 0))

(setq spacer (list (vector ':size button-space
':style '2d)))))

(setq eserve-current-toolbar (append eserve-current-toolbar spacer (list (vector
```

```
               (list (make-pixmap (eserve-button-iconfile
toolbar-item)))

button-cmd button-sensesym (eserve-button-help toolbar-item)))

))))

;;;

;;; XEmacs-specific functions

;;;

(defun eserve-xemacs-create-extent (mark-type start
end)

;; Create an extent in the current buffer with the
properties of MARK-TYPE

;; and return it.  The function `eserve-create-
overlay-or-extent' is aliased

;; to this one when running XEmacs.  Note, the
arguments START and END are

;; not used and are present only because the
corresponding function in GNU

;; Emacs `eserve-emacs-create-overlay' needs them.

(when (or (eserve-mark-type-fgColor mark-type)

(eserve-mark-type-bgColor mark-type)

(eserve-mark-type-face    mark-type))

(let ((pixmap (eserve-mark-type-glyph mark-type))
```

- 109 -

```
            (face (eserve-mark-type-face mark-type))

(extent (make-extent start end (current-
buffer))))   ;no location!

(if face (set-extent-face extent face)

(set-extent-face extent 'eserve-highlight))

(when pixmap (set-extent-begin-glyph extent pixmap 'outside-
margin)

(set-buffer-left-margin-width 3))

;;`after-change-function' is buffer local (setq after-change-function 'eserve-xemacs-
change-function)  ;TBD: Replace extent)))                            ;return the
newly created extent (defun eserve-xemacs-change-function (start end old-
length)

;; Called by `after-change-function' to see if a
newline was inserted and

;; if so, to terminate the extent before that point.
TBD: the

;; corresponding operation of gluing two lines
together to form a single

;; highlighted line.

(save-excursion (goto-char start)

(when (and (re-search-forward "\n" end t)  ;return
nil on failure
```

```
                    (<= (point) end)
        (let
              ((extent (extent-at (point)))) ;returns smallest extent
              (if extent (set-extent-endpoints extent (extent-start-position extent)
                                                (point)))))))))

(defun eserve-xemacs-delete-extent (extent)
       (when extent
          (delete-extent extent)
          (setq after-change-function nil)))

;;;
   ;;; GNU Emacs-specific functions
   ;;;

(defun eserve-emacs-create-overlay (mark-type start end)
       ;; Create an overlay with the properties specified by MARK TYPE and return
       ;; it.  The function `eserve-create-overlay-or-extent' is aliased to this one
       ;; when running GNU Emacs v19.  N.B.  There are no pixmaps (i.e. true
       ;; glyphs) in GNU Emacs v19.  TBD: replace use of gensym.
       (let
```

```
        ((overlay (make-overlay start end))
         (face (eserve-mark-type-face mark-type)))
      (cond
       (face
        (overlay-put overlay 'face (face-name face))
        (overlay-put overlay 'modification-hooks
                     (list 'eserve-emacs-modification-function))
        overlay))))

(defun eserve-emacs-delete-overlay (overlay)
      (when overlay
        (delete-overlay overlay)))

(defun eserve-emacs-modification-function (overlay start end)
      ;; Called by the modification hook in the overlay to see if a newline was
      ;; inserted and if so, to terminate the extent before that point.  TBD:
      ;; the corresponding operation of gluing two lines together to form a
      ;; single highlighted line.
      (save-excursion
        (if (string-match "
" (this-command-keys))
            (move-overlay overlay (overlay-start overlay) (point)))))
```

```
    (provide 'eserve)   ;Announce that we're providing the
package 'eserve'.

;; Copyright (C) 09 Jun 1995  Sun Microsystems, Inc.
```

What is claimed is:

1. An apparatus containing a system to integrate an application from a set of applications having a set of command identifiers with an editor from a set of editors having a set of editor commands, the system comprising:

a table for storing associations between command identifiers from the set of command identifiers and editor commands from the set of editor commands; and an application-to-editor communicator for receiving from any one of the applications a command identifier and transmitting to one of the editors the editor command associated in the table with the received command identifier.

2. The apparatus of claim 1 wherein the system additionally comprises an editor-to-application communicator for receiving from the editor an editor command and for transmitting to the application the command identifier from the table associated with the received editor command.

3. The apparatus of claim 2 further comprising a registration manager for associating a user-selected application from the set of applications with a user-selected editor from the set of editors, wherein the editor-to-application communicator, responsive to receiving an editor command from an editor, transmits the command identifier of the application associated by the registration manager with the editor.

4. The apparatus of claim 3 further comprising an application registration table for storing associations between each user-selected editor with a user-selected application from the set of applications.

5. The apparatus of claim 1 additionally comprising a registration manager for associating a user-selected editor from the set of editors with a user-selected application in the set of applications, wherein the application-to-editor communicator, responsive to receiving a command identifier from an application, transmits the editor command of the editor associated by the registration manager with the application.

6. The apparatus of claim 5 further comprising:

an editor registration table for storing associations between each user-selected application with a user-selected editor from the set of editors.

7. A computer-implemented method of integrating an application from a set of applications having a set of command identifiers with an editor from a set of editors having a set of editor commands, the method comprising the steps of:

for each application from the set of applications, storing associations between command identifiers in the set of command identifiers and editor commands in the set of editor commands;

receiving from an application a first command identifier in the set of command identifiers; and transmitting to one of the editors a first editor command in the set of editor commands associated in the table with the received first command identifier.

8. The method of claim 7 comprising the additional steps of:

associating a user-selected editor from the set of editors with a user-selected application in the set of applications; and transmitting to the user-selected editor associated with the user-selected application the first editor command in the set of editor commands associated with the received first command identifier.

9. A computer readable memory for use with a processor and storage, the memory storing a computer program executable by the processor for integrating an application from a set of applications having a set of command identifiers with an editor from a set of editors having a set of editor commands, by performing the steps of:

for each application from the set of applications, storing associations between command identifiers in the set of command identifiers and editor commands in the set of editor commands;

receiving from an application a first command identifier in the set of command identifiers; and transmitting to one of the editors a first editor command in the set of editor commands associated in the table with the received first command identifier.

10. The computer readable memory of claim 9 additionally comprising the steps of:

associating a user-selected editor from the set of editors with a user-selected application from the set of applications; and transmitting to the editor associated with the application the first editor command in the set of editor commands associated with the received first command identifier.

11. The method of claim 9 comprising the additional steps of:

receiving from an editor a second editor command from the set of editor commands; and transmitting to the application a second command identifier from the table associated with the received second editor command.

* * * * *

UNITED STATES PATENT AND TRADEMARK OFFICE
CERTIFICATE OF CORRECTION

PATENT NO. : 5,835,769

DATED : November 10, 1998

INVENTOR(S) : Robert B. Jervis, Daniel J. O'Leary, Achut P. Reddy, Evan W. Adams, Robin Jeffries.

It is certified that errors appear in the above-identified patent and that said Letters Patent is hereby corrected as shown below:

On the title page under Item [54]--

In the title replace "APPARATTI" with --APPARTI--

Column 1, line 1 replace "APPARATTI" with --APPARATI--

Column 1, line 7 replace "Ser. No. 08/530,595" with --Ser. No. 08/530,019--

Column 168, line 42 replace "of claim 9" with --of claim 7--

Signed and Sealed this

Fourth Day of May, 1999

*Attest:*

Q. TODD DICKINSON

*Attesting Officer*     Acting Commissioner of Patents and Trademarks

UNITED STATES PATENT AND TRADEMARK OFFICE
CERTIFICATE OF CORRECTION

PATENT NO. : 5,835,769

DATED : November 10, 1998

INVENTOR(S) : Robert B. Jervis, Daniel J. O'Leary, Achut P. Reddy, Evan W. Adams, Robin Jeffries.

It is certified that error appears in the above-identified patent and that said Letters Patent is hereby corrected as shown below: On the title page, under [54], replace "APPARATTI" with --APPARATI--

Column 1, line 1 replace "APPARATTI" with --APPARATI--

Column 1, line 7 replace "Ser. No. 08/530,595" with --Ser. No. 08/530,019--

Column 168, line 42 replace "of claim 9" with --of claim 7--

Signed and Sealed this

Sixth Day of July, 1999

Attest:

Q. TODD DICKINSON

*Attesting Officer*  *Acting Commissioner of Patents and Trademarks*